United States Patent
Nakano et al.

(10) Patent No.: US 6,503,169 B2
(45) Date of Patent: Jan. 7, 2003

(54) APPARATUS FOR CONTROLLING A POWER TRANSMISSION DEVICE

(75) Inventors: Shigeji Nakano, Wako (JP); Junji Urano, Wako (JP); Yoichi Sato, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 18 days.

(21) Appl. No.: 09/793,765

(22) Filed: Feb. 27, 2001

(65) Prior Publication Data

US 2001/0019984 A1 Sep. 6, 2001

(30) Foreign Application Priority Data

Mar. 3, 2000 (JP) .................................... 2000-058652
Mar. 10, 2000 (JP) .................................... 2000-066091

(51) Int. Cl.$^7$ ............................................. F16H 61/58
(52) U.S. Cl. .......................... 477/62; 477/80; 477/65; 475/65; 475/70; 475/120; 192/3.29; 192/3.63
(58) Field of Search ............................. 477/62, 65, 80, 477/86; 475/61, 65, 66, 70, 120, 127; 192/3.29, 3.3, 3.31, 3.63

(56) References Cited

U.S. PATENT DOCUMENTS

| | | | | |
|---|---|---|---|---|
| 4,607,731 A | * | 8/1986 | Sugano | 192/3.29 |
| 5,094,129 A | * | 3/1992 | Sugaya et al. | 474/11 |
| 5,119,698 A | * | 6/1992 | Sugaya et al. | 477/38 |
| 5,641,043 A | * | 6/1997 | Niiyama | 192/3.58 |

* cited by examiner

*Primary Examiner*—Sherry Estremsky
*Assistant Examiner*—Tisha D. Lewis
(74) *Attorney, Agent, or Firm*—Armstrong, Westerman & Hattori, LLP

(57) ABSTRACT

An apparatus for controlling a power transmission device, having a lockup shift valve that changes the operating state and non-operating state of the lockup mechanism, and a regulator valve that is capable of changing the pressure (line pressure) of working oil used to operate a speed changer CVT between a low pressure and a high pressure, wherein changeover between a mode, where the lockup mechanism is operated and the line pressure is set to a low pressure, and a mode, where the lockup mechanism is not operated and the line pressure is set to a high pressure, is carried out by changing the output of ON and OFF signals from the first solenoid valve.

7 Claims, 8 Drawing Sheets

TO OIL COOLER

Fig. 4

| | First solenoid valve | Second solenoid valve | Engagement control of lockup mechanism | Engagement control of friction engagement elements | Line pressure |
|---|---|---|---|---|---|
| (1) | OFF | OFF | Not available (non-engaged) | Available | High pressure |
| (2) | ON | OFF | Available | Not available (Completely engaged) | Low pressure |
| (3) | ON | ON | Available | Available | Low pressure |
| (4) | OFF | ON | Available | Available | High pressure |

Fig. 6

| | First solenoid valve | Second solenoid valve | Engagement control of lockup mechanism | Engagement control of friction engagement elements | Working oil supply capacity |
|---|---|---|---|---|---|
| (1) | OFF | OFF | Not available (non-engaged) | Available | Large |
| (2) | ON | OFF | Available | Not available (Completely engaged) | Small |
| (3) | ON | ON | Available | Available | Small |
| (4) | OFF | ON | Available | Available | Large |

APPARATUS FOR CONTROLLING A POWER TRANSMISSION DEVICE

FIELD OF THE INVENTION

The present invention relates to an apparatus for controlling a power transmission device, which is provided with a lock-up mechanism in a torque converter secured between a prime mover and a speed changer.

BACKGROUND OF THE INVENTION

As such a power transmission device, there is, for example, such a construction that the power of a prime mover, which is inputted via a torque converter, is transmitted by a belt-type step-free reduction mechanism consisting of a drive-side pulley, a driven-side pulley and a belt member suspended over both the pulleys, or by a forward and rearward changer mechanism consisting of friction engagement elements. Such a power transmission device has been employed for vehicles, etc. In such a power transmission device, the speed changer is operated by utilizing line pressure that is obtained by regulating working oil pressure provided from a hydraulic pump, and engagement control of the lockup mechanism is carried out by utilizing surplus oil produced when regulating the pressure. Herein, where a load is large and the number of output revolutions of the speed changer (a vehicle speed is low where the speed changer is applied to the vehicle) is small (at this time, the lockup is not carried out), or where the speed is quickly reduced from a constant (high-speed) running state, it is necessary to provide a large capacity of working oil of high pressure in order to operate the speed changer. Therefore, the power transmission device is constructed so that at least such working oil can be supplied to the speed changer.

On the other hand, in such a power transmission device, although the lockup is performed between the prime mover and speed changer where the load of the speed changer is small and the number of output revolutions of the speed changer, is large, no high-pressure working oil is required to operate the speed changer in such situations, and since the frequency of speed reduction is low, no large capacity of working oil is required. Therefore, in such situations, if the line pressure is retained at a high-pressure level or a large capacity of working oil is continuously supplied, such a problem occurs, where the loss of power will become remarkable, and the fuel consumption will be increased.

Further, in such a power transmission device for a vehicle, in order to prevent an excessive torque from being inputted onto a belt or to relieve a shock occurring when changing the mode from neutral to drive or changing from forward drive to rear drive, it is necessary to control the engagement capacity of friction engagement elements (forward drive clutch or rearward drive brake) that constitute the forward and rearward changer mechanism. Engagement capacity control of such friction engagement elements is carried out by controlling the oil pressure provided to the friction engagement elements. However, a linear solenoid valve is frequently used where it is necessary to carry out the oil pressure control at high accuracy. In addition, in the lockup mechanism of a torque converter, it is preferable that engagement capacity control optimal for the vehicle velocity, etc., is performed. The linear solenoid valve is also frequently used for these purposes.

Actually however, such linear solenoid valves are generally expensive, and if two linear solenoid valves are used as described above, another problem occurs, where the construction increases the cost thereof.

SUMMARY OF THE INVENTION

It is therefore an object of the invention to provide an apparatus for controlling a power transmission device, which adjusts the pressure or supply quantity of working oil used for operation a speed changer in compliance with operation control of a lockup mechanism in response to a load, and which is devised so as to improve the fuel consumption by decreasing the loss of power.

Also, it is another object of the invention to provide an apparatus for controlling a power transmission device, which enables engagement capacity control of friction engagement elements and engagement capacity control of the lockup mechanism by means of a single linear solenoid valve.

A first aspect of the invention is an apparatus for controlling a power transmission device that is provided with a lockup mechanism for connection and disconnection between a prime mover (for example, an engine in an embodiment) and a speed changer (for example, a step-free speed changer, CVT, in the embodiment) in response to supply and discharge of working oil in a torque converter secured between the prime mover and the speed changer, wherein the apparatus comprises a lockup changing means (for example, a lockup shift valve 190 in the embodiment) that causes the lockup mechanism to change the position thereof between the first position (for example, the lockup mechanism operating position in the embodiment) where the lockup mechanism supplies and discharges the working oil so as to carry out the connection and the second position (for example, the lockup mechanism non-operating position in the embodiment) where the lockup mechanism supplies and discharges the working oil so as to carry out the disconnection; a working oil pressure changeover setting means (for example, a regulator valve 110 in the embodiment) that is capable of changing the pressure setting state thereof to the first state (for example, a state corresponding to low pressure in the embodiment) where the pressure of working oil used to operate the speed changer is set to the first pressure (for example, low line pressure in the embodiment) and to the second state (for example, a state corresponding to high pressure in the embodiment) where the pressure of working oil used to operate the speed changer is set to the second pressure (for example, high line pressure in the embodiment), which is higher than the first pressure; and a signal pressure outputting means (for example, an electrical control unit and first solenoid valve 150 in the embodiment) for selectively outputting any one of the first signal pressure by which the lockup changing means is positioned at the first position and the working oil pressure changing means is made into the first state and the second signal pressure by which the lockup changing means is positioned at the second position and the working oil pressure changing means is made into the second state.

The apparatus for controlling a power transmission device according to the first aspect of the invention is constructed so that a mode where the lockup mechanism is made into an operating state (a state where the output shaft of a prime mover is connected to the input shaft of a speed changer), and the pressure (line pressure) of working oil used to operate the speed changer is set to low pressure level, and a mode where the lockup mechanism is made into a non-operating state (a state where the prime mover is disconnected from the speed changer), and the pressure of the working oil is set to a high pressure level are changed over by changing the outputs of two types of signal pressure, which are the first signal pressure and second signal pressure. Therefore, the latter mode is selected where the load is large and the number of output revolutions of the speed changer (the running speed of a vehicle in which the power transmission device is incorporated) is small, and the former mode is selected where the load is small and the number of output revolutions thereof is large, whereby the fuel consumption can be decreased by lowering the loss of power. In addition, the output of the signal pressure can be changed over by, for example, only an ON-OFF controllable single solenoid valve and control device thereof, and the construction thereof can be simplified.

Also, a second aspect of the invention is an apparatus for controlling a power transmission device that is provided with a lockup mechanism for connection and disconnection between a prime mover (for example, an engine in an embodiment) and a speed changer (for example, a step-free speed changer, CVT, in the embodiment) in response to supply and discharge of working oil in a torque converter secured between the prime mover and the speed changer, wherein the apparatus comprises a lockup changing means (for example, a lockup shift valve 190 in the embodiment) that causes the lockup mechanism to change the position thereof between the first position (for example, the lockup mechanism operating position in the embodiment) where the lockup mechanism supplies and discharges the working oil so as to carry out the connection and the second position (for example, the lockup mechanism non-operating position in the embodiment) where the lockup mechanism supplies and discharges the working oil so as to carry out the disconnection; a capacity-changing type hydraulic pump that supplies working oil used to operate the speed changer at the first capacity (for example, a small capacity in the embodiment) or at the second capacity (for example, a large capacity in the embodiment) that is greater than the first capacity; a capacity changing means (for example, a discharge capacity changing valve 101 in the embodiment) that causes the hydraulic pump to be changed between the first position (for example, a position corresponding to the small capacity in the embodiment) where working oil is supplied to the hydraulic pump at the first capacity and the second position (for example, a position corresponding to the large capacity in the embodiment) where working oil is supplied to the hydraulic pump at the second capacity; and a signal pressure outputting means (for example, an electrical control unit and first solenoid valve 150 in the embodiment) for selectively outputting any one of the first signal pressure, by which the lockup changing means is positioned at the first position and the capacity changing means is positioned at the first position, and the second signal pressure, by which the lockup changing means is positioned at the second position and the capacity changing means is positioned at the second position.

The apparatus for controlling a power transmission device according to the second aspect of the invention is constructed so that a mode where the lockup mechanism is made into an operating state (a state where the output shaft of a prime mover is connected to the input shaft of a speed changer), and the working oil used to operate the speed changer is supplied at a small capacity from the hydraulic pump, and a mode where the lockup mechanism is made into a non-operating state (a state where the prime mover is disconnected from the speed changer), and the working oil is supplied at a large capacity from the hydraulic pump are changed over by changing the outputs of two types of signal pressures. Therefore, the latter mode is selected where the load is large and the number of output revolutions of the speed changer (the running speed of a vehicle in which the power transmission device is incorporated) is small, and the former mode is selected where the load is small and the number of output revolutions thereof is large, whereby the fuel consumption can be decreased by lowering the loss of power. In addition, the output of the signal pressure can be changed over by, for example, only an ON-OFF controllable single solenoid valve and control device thereof, and the construction thereof can be simplified.

A third aspect of the invention is an apparatus for controlling a power transmission device that is provided with a speed changer (for example, a step-free speed changer, CVT, in the embodiment), which changes power inputted from a primer mover (for example, an engine in the embodiment) and outputs the same; a torque converter that is secured between the output shaft (for example, a crankshaft Es in the embodiment) of the prime mover and the input shaft (for example, an input shaft 20 in the embodiment) of the speed changer and transmits power; and a lockup mechanism that transmits power between the output shaft and the input shaft at an engagement capacity in response to supplied oil pressure; wherein the apparatus comprises: friction engagement elements (for example, forward clutch 65 and rearward brake 66 in the embodiment) that transmit power in the speed changer at an engagement capacity in response to the supplied oil pressure; a linear solenoid valve (for example, a linear solenoid valve 130 in the embodiment) for producing control pressure by regulating line pressure; a first change valve (for example, a clutch shift valve 150 in the embodiment) having the first position where the control pressure is supplied to the friction engagement elements and the second position where the line pressure is supplied to the friction engagement elements; a second change valve (for example, a lockup shift valve 170 in the embodiment) having the first position where the control pressure is supplied to the lockup mechanism and the second position where supply of the control pressure to the lockup mechanism is interrupted; and a signal pressure outputting means (for example, a solenoid valve 140 in the embodiment) for selectively outputting any one of the first signal pressure (for example, OFF signal pressure in the embodiment) by which the first change valve is positioned at the first position and the second change valve is positioned at the second position and the second signal pressure (for example, ON signal pressure in the embodiment) by which the first change valve is positioned at the second change position and the second change valve is positioned at the first position. The control pressure supplied to the friction engagement elements and lockup mechanism includes control pressure produced by the linear solenoid valve and those (for example, engagement capacity control pressure of the lockup mechanism 50, which is obtained by being converted by a lockup control valve 180, in the embodiment) obtained by converting (for example, amplifying) by means of other valves.

In the apparatus for controlling a power transmission device according to the third aspect of the invention, since the first change valve is positioned at the first position by the signal pressure outputting means, and the second change valve is positioned at the second position, it is possible to control an engagement capacity of the friction engagement elements by using the control pressure produced by the linear solenoid valve. At this time, although the engagement capacity of the lockup mechanism cannot be controlled by using the control pressure, the engagement capacity of the friction engagement elements is controlled when amplifying the torque by means of the torque converter (if the control device is for a vehicle, when starting the vehicle), wherein since the lockup mechanism is not operated in such a situation, there is no disadvantage. On the other hand, since the first change valve is positioned at the second position by the signal pressure outputting means, and the second change valve is positioned at the first position, it becomes possible to control the engagement capacity of the lockup mechanism by using the control pressure produced by the linear solenoid valve. At this time, the line pressure is supplied to the friction engagement elements, thereby causing a completely engaged state to be maintained, wherein, although no engagement capacity control can be performed, since the engagement capacity of the lockup mechanism is controlled when the output of the prime mover is stabilized and the torque is not amplified by the torque converter (that is, when a vehicle runs at a high speed if the control device is employed in the vehicle), the engagement capacity control of the friction engagement elements is not required in such a situation. That does not constitute any problem.

As described above, in the apparatus according to the third aspect of the invention, it is possible to change an object to be controlled by control pressure produced by the linear solenoid valve to any one of the friction engagement elements and the lockup mechanism, wherein both engagement capacity control of the friction engagement elements and engagement capacity control of the lockup mechanism can be carried out by means of a single linear solenoid valve. Therefore, the apparatus for controlling a power transmission device according to the invention does not require two linear solenoid valves as in the related arts, wherein the production costs thereof can be remarkably reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 4 is a table showing the relationship among combinations of signal pressures from the first and second solenoid valves, availability of engagement control of a lockup mechanism and friction engagement elements, and line pressure, according to the first aspect of the invention, FIG. 6 is a table showing the relationship among combinations of outputs of signal pressures from the first and second solenoid valves, availability of engagement control of a lockup mechanism and friction engagement elements, and working oil supply quantity, according to the second aspect of the invention.

DESCRIPTION OF THE PREFERRED EMBODIMENTS

Figure 3:
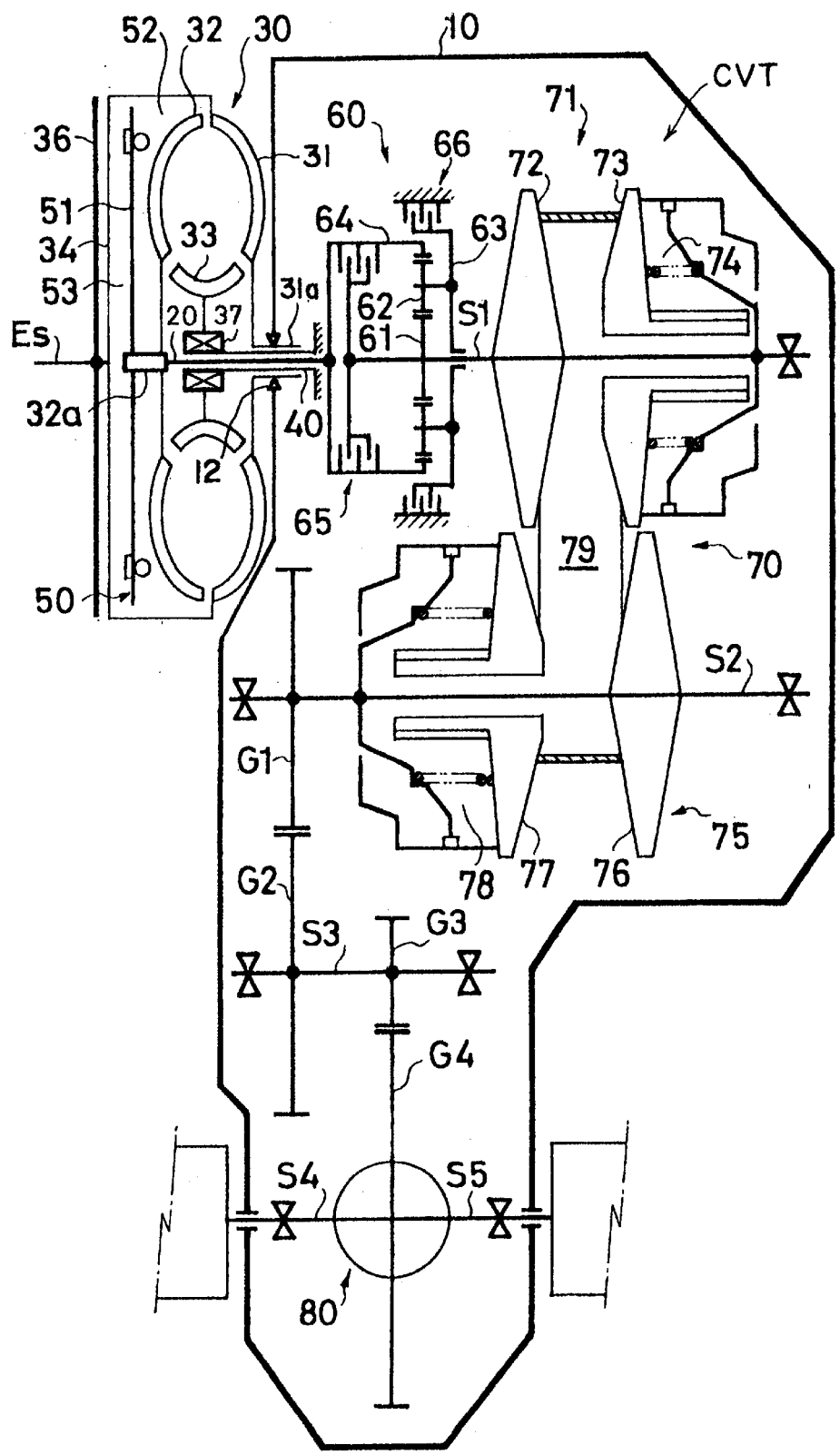
FIG. 3 is a skeleton diagram showing the configuration of a power transmission device for a vehicle, which is provided with the above-described controlling apparatus.

Hereinafter, a description is given of preferred embodiments of the invention with reference to the accompanying drawings. In the embodiments shown herein, an apparatus for controlling a power transmission device according to the invention is employed for a vehicle, and FIG. 3 roughly shows the configuration of a power transmission channel in the power transmission device for a vehicle.

The apparatus for controlling a power transmission device for a vehicle is composed so as to have a step-free speed changer CVT, which changes and outputs power inputted from an engine (a prime mover), and a torque converter 30 that intervenes between the engine and the step-free speed changer CVT and transmits power. The step-free speed changer CVT is accommodated in a transmission casing 10, and an input shaft 20, a primary shaft S1, a secondary shaft S2, and counter shaft S3, and right and left axle shafts S4 and S5 are rotatably supported by bearings attached to the transmission casing 10. Herein, the input shaft 20 and primary shaft S1 are disposed on the same axis while the secondary shaft S2 is positioned at a fixed distance apart from the input shaft 20 (or the primary shaft S1) in parallel thereto. The counter shaft S3 is positioned at a fixed distance apart from the secondary shaft S2 in parallel thereto, and the right and left axle shafts S4 and S5 are disposed on the same axis and are positioned at a fixed distance apart from the counter shaft S3 in parallel thereto.

Power from the engine (not shown) is inputted into the input shaft 20 via the torque converter 30. The torque converter 30 is constructed so as to have a pump impeller 31, a turbine runner 32 and a stator 33. The pump impeller 31 is made integral with a converter cover 34 that covers up the outer periphery of the pump impeller 31, and is attached to a crankshaft Es of the engine via a drive plate 36 on which a starter gear is attached. The turbine runner 32 is coupled to the input shaft 20 via a turbine runner hub 32a, and the stator 33 is attached to a stator shaft 40 via a one-way clutch 37. In addition, the boss part 31a of the pump impeller is supported by a bearing 12 so as to freely rotate.

The torque converter 30 is provided with a lockup mechanism 50, and is constructed so that a lockup clutch piston 51 attached to the turbine runner hub 32a is pressed to the inner surface of the converter cover 34 to cause both members 51 and 34 to be engaged with each other, and power from the engine is transmitted directly to the input shaft 20. The lockup clutch piston 51 is operated by supplying oil to or discharging the same from two oil chambers formed by partitioning a space in the torque converter 30 by the lockup clutch 51, that is, an oil chamber (turbine side oil chamber 52) formed at the turbine runner 32 side further than the lockup clutch 51, and another oil chamber (cover side oil chamber 53) formed at the converter cover 34 side further than the lockup clutch piston 51.

Power of the input shaft 20 is transmitted to the primary shaft S1 via the forward and rearward changer mechanism 60. The forward and rearward changer mechanism 60 is constructed so as to have a sun gear 61 fixed at the primary shaft S1, a plurality of pinion gears 62 connected to the outer circumference of the sun gear 61, a carrier 63 that is rotatable with respect to the primary shaft S1 and supports the plurality of pinion gears 62 so as to freely rotate the same, and a ring gear 64, which is fixed at the input shaft 20 and the inner side of which is connected to the plurality of pinion gears 62. The primary shaft S1 and ring gear 64 are engageable with each other by hydraulically actuating the forward clutch 65, and the carrier 63 and transmission casing 10 are engageable with each other by hydraulically actuating the rearward brake 66.

Herein, where the forward clutch 65 is engaged and the rearward brake 66 is disengaged, since the input shaft 20, ring gear 64, pinion gears 62, sun gear 61 and carrier 63 rotate integrally with each other, the primary shaft S1 rotates in the same direction as that of the input shaft 20. Where the forward clutch 65 is disengaged and the rearward brake 66 is engaged, since rotation of the input shaft 20 is transmitted by the carrier 63 to the sun gear 61 via the pinion gears 62 whose rotation axis is fixed, the primary shaft S1 rotates inversely to the input shaft 20.

Power of the primary shaft S1 is transmitted to the secondary shaft S2 via a belt type step-free speed changer mechanism 70 that is composed of a drive side pulley 71 secured on the primary shaft S1, a driven side pulley 75 secured on the secondary shaft S2, and a metallic V-belt 79 suspended over both pulleys 71 and 75.

The drive side pulley 71 is composed of a fixed pulley half body 72 fixed on the primary shaft S1 and a movable pulley half body 73 secured, so that it can freely slide on the primary shaft S1 in the axial direction, opposite to the fixed pulley half body 72, wherein it is possible to change the interval (pulley width) between the fixed pulley half body 72 and the movable pulley half body 73 by moving the movable pulley half body 73 by supplying oil into or discharging the same from a cylinder chamber 74. In addition, the driven side pulley 75 is composed of a fixed pulley half body 76 fixed on the secondary shaft S2 and a movable pulley half body 77 secured, so that it can freely slide on the secondary shaft S2 in the axial direction, opposite to the fixed pulley half body 76, wherein it is possible to change the interval (pulley width) between the fixed pulley half body 76 and the movable pulley half body 77 by moving the movable pulley half body 77 by supplying oil into or discharging the same from a cylinder chamber 78. And, it is possible to change the winding radius of the metallic V-belt 79 by adjusting the pulley width of both the pulleys 71 and 75, whereby the speed change ratio between both the shafts S1 and S2 can be varied free of step.

The power inputted to the secondary shaft S2 is transmitted to the counter shaft S3 via gears G1 and G2, and is further transmitted to a differential mechanism 80 via a final drive gear G3 and a final driven gear G4. In the differential mechanism 80, the inputted power is divided so as to enter the right and left front axle shafts S4 and S5 and is transmitted thereto. Finally, the power is transmitted to drive the right and left wheels (front wheels) (not shown) that are, respectively, attached to the end portions of both the shafts S4 and S5.

Thus, in the apparatus for controlling a power transmission device for a vehicle, the power of the engine, which is inputted to the input shaft 20 via the torque converter 30, is transmitted to the right and left front wheels via the forward and rearward changer mechanism 60 and belt type step-free speed changer mechanism 70, whereby a vehicle can run. Any optional speed change ratio can be obtained free of step by actuating the belt-type step-free speed changer mechanism 70 as described above. In addition, the running direction of the vehicle can be changed by actuating the forward and rearward changer mechanism 60.

Figure 1:
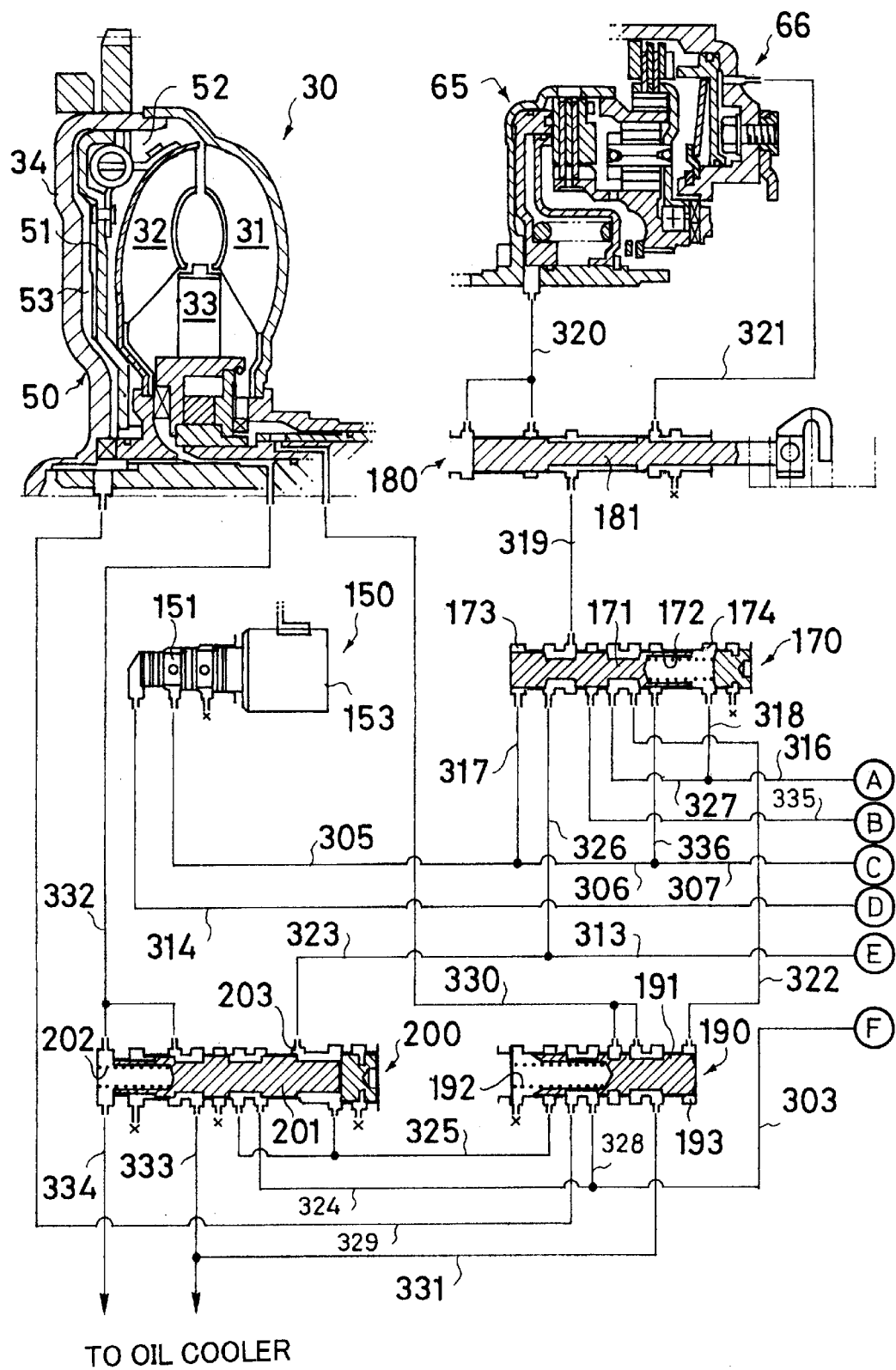
FIG. 1 is a diagram of hydraulic circuits showing the configuration of an apparatus for controlling a power transmission device according to the first aspect of the invention.
Figure 2:
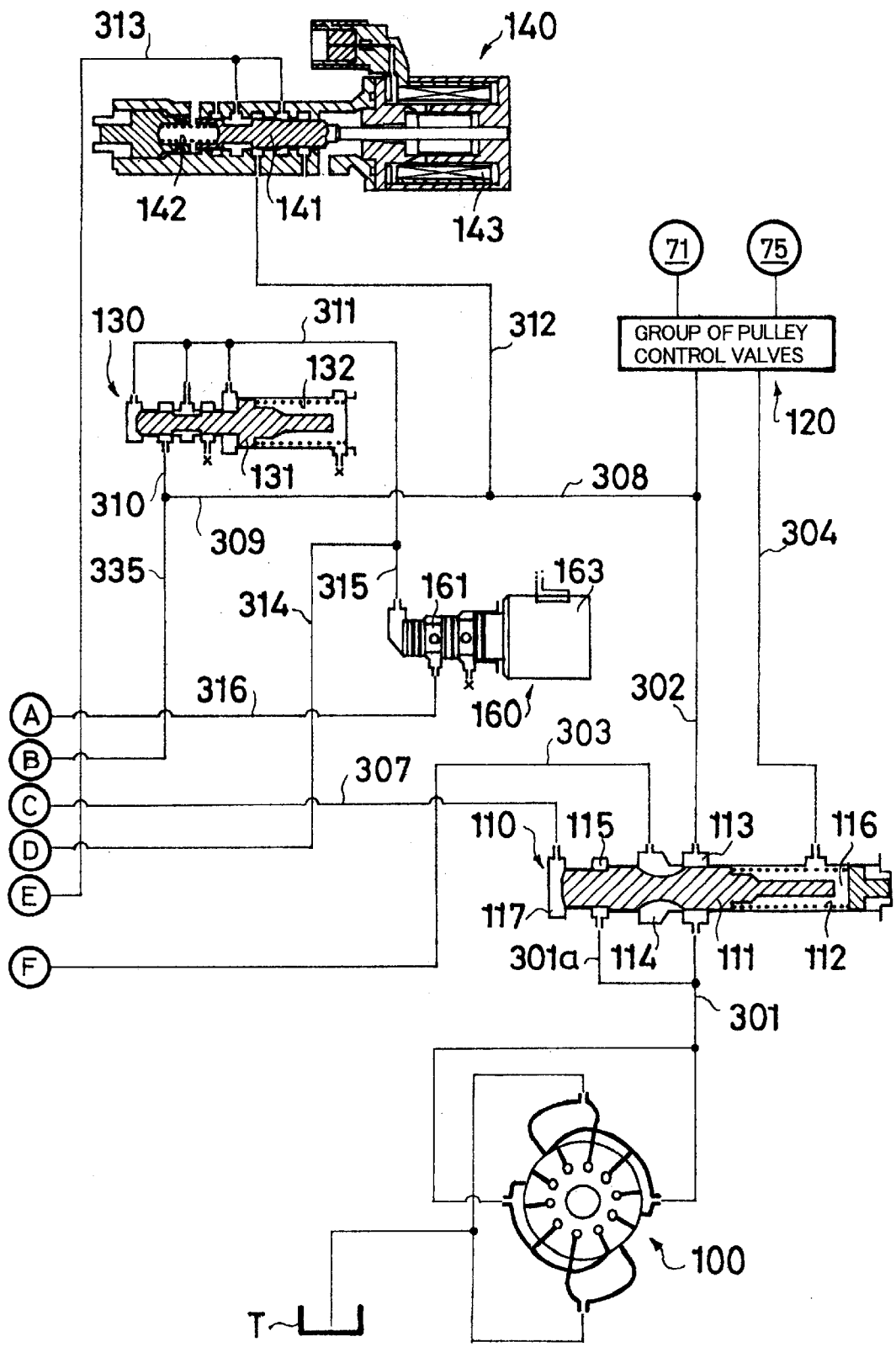
FIG. 2 is a diagram of hydraulic circuits showing the configuration of an apparatus for controlling a power transmission device according to the first aspect of the invention.

FIG. 1 and FIG. 2 are hydraulic circuit diagrams showing a part of the configuration of an apparatus for controlling a power transmission device for a vehicle. These drawings correspond to the apparatus for controlling a power transmission device for a vehicle according to the first aspect of the invention. Also, in both the drawings, the encircled letters A through F indicate that oil lines are connected to each other.

The controlling apparatus is composed of a hydraulic pump 100, a regulator valve 110, a group of pulley controlling valves 120, modulator valve 130, linear solenoid valve 140, first solenoid valve 150, second solenoid valve 160, clutch shift valve 170, manual valve 180, lockup shift valve 190, lockup control valve 200 and electric control unit (not illustrated in FIG. 1 and FIG. 2) in addition to the above-described torque converter 30, drive side pulley 71, driven side pulley 75, forward clutch 65, and rearward brake 66. Herein, the operation of a plurality of linear solenoid valves (not illustrated) included in the linear solenoid valve 140, the first solenoid valve 150, the second solenoid valve 160 and a group of pulley control valves 120 is carried out by the electric control unit on the basis of information pertaining to the number of revolutions of the engine, the degree of throttle openness, vehicle velocity, temperature of the working oil, etc., that are detected by detectors (not illustrated).

The hydraulic pump 100 sucks in working oil from an oil tank T and discharges the same into an oil line 301 connected to the regulator valve 110. In FIG. 2, a vane pump is illustrated as an example of the hydraulic pump 100. The hydraulic pump 100 is not necessarily a vane pump.

The regulator valve 110 is composed of a spool 111 that can move in the right and left directions in the housing thereof, and a spring 112 that is provided at the rightward side of the spool 111 and always presses the spool 111 to the leftward side thereof. An oil chamber 113 is provided in the vicinity of the central portion of the regulator valve 110, and the oil chamber 113 causes the above-described oil line 301 connected to the hydraulic pump 100 to communicate with the oil line 302 connected to the group of pulley control valves 120. Therefore, while the working oil discharged from the hydraulic pump 100 flows into the group of pulley control valves 120 via the oil chamber 113, the working oil in the oil line 301 enters the oil chamber 115 through the branched oil line 301a and provides the spool 111 with a rightward pressing force. Accordingly, the spool 111 causes the oil chamber 113 and the oil chamber 114 to communicate with each other at the position where the rightward pressing force and the leftward pressing force provided by the spring 112 are balanced, wherein a part of the working oil in the oil chamber 113 is discharged from the oil line 303 as surplus oil. Therefore, the pressure in the oil line 302 is regulated at a predetermined pressure (line pressure). Also, the surplus oil discharged from the oil line 303 is supplied into the torque converter 30 as described below, or is used as a lubricant oil for the respective portions of the step-free speed changer CVT.

The spring chamber 116 of the regulator valve 110 is connected with the group of pulley control valves 120 through the oil line 304 and is devised so as to operate the regulation pressure outputted from the group of pulley control valves 120 on the basis of an instruction of the electric control unit. The regulation pressure is set to a level in response to the degree of throttle openness, etc., and causes the spool 111 to produce an additional leftward pressing force, thereby increasing the regulator regulation pressure, wherein the line pressure is accordingly increased. Generally, when the accelerator opening degree is large, for example, when a vehicle is accelerating the running velocity or is ascending a slope, the line pressure is devised so as to be increased.

In addition, the oil chamber 117 formed at the leftward side of the spool 111 is connected with the first solenoid valve 150 via the oil lines 305, 306, and 307. The first change controlling pressure (described later) that is outputted by operation of the first solenoid valve 150 on the basis of an instruction from the electric control unit is caused to operate to give the spool 111 a rightward pressing force, whereby it is possible to set the line pressure to a lower level than normal. Hereinafter, the line pressure at a normal level that is set in a situation such that the first change controlling pressure does not operate on the oil chamber 117 is called "high line pressure", wherein this state is called a "state corresponding to high pressure", and line pressure, which is lower than usual, set under the situation that the first change controlling pressure operates in the oil chamber 117 is called "low line pressure", wherein this state is called a "state corresponding to lower pressure". Also, the output of the first change controlling pressure from the first solenoid valve 150 corresponds to output of the first signal pressure in the scope of Claims, and non-output of the first change controlling pressure from the first solenoid valve 150 corresponds to output of the second signal pressure in the scope of Claims.

The group of pulley controlling valves 120 regulates the line pressure supplied via the oil line 302 (the pressure regulating control is carried out by the electric control unit), wherein by supplying the line pressure into both the cylinder chambers 74 and 78 described above, the drive side pulley 71 and driven side pulley 75 are actuated. Thereby, the winding radius of the metallic V-belt 79 can be varied, and a speed change operation of the belt-type step-free speed changer mechanism 70 is carried out.

The modulator valve 130 is composed of a spool 131, which freely moves in the right and left directions in the housing, and a spring 132 that is provided at the right of the spool 131 and normally presses the spool 131 in the leftward direction. The modulator valve 130 regulates the line pressure supplied via oil lines 302, 308, 309 and 310 and supplies modulator pressure into the oil line 311. However, since a rightward pressing force, which is produced by operation of the pressure in the oil line 311 as back pressure, operates on the spool 131 in addition to the leftward pressing force made by the spring 132, the modulator pressure is regulated to a value that is balanced by the pressing force made by the spring 131.

The linear solenoid valve 140 is composed of a spool 141, which freely moves in the right and left directions in the casing, a spring 142 that is provided at the leftward side of the spool 141 and normally presses the spool 141 in the rightward direction, and a solenoid 143 secured at the rightward of the spool 141. The spool 141 is devised so as to move to the leftward side by a quantity responsive to the suction force of the solenoid 143 that is controlled by the electric control unit, whereby the line pressure supplied through the oil lines 302, 308 and 312 is regulated to produce control pressure, which will be supplied into an oil line 313.

The first solenoid valve 150 is composed of a spool 151, which freely moves in the right and left directions in the housing, a spring (not illustrated) that normally presses the spool 151 in the leftward direction, and a solenoid 153 secured at the rightward of the spool 151. The spool 151 is devised so as to move rightward in response to generation of a suction force produced at the solenoid 153 that is controlled by the electric control unit. At this time, the spool 151 causes a branched oil line 314 of the oil line 311, which is an oil flow line of the modulator pressure, to communicate with the oil line 305, wherein the modulator pressure is outputted into the oil line 305 as the first change controlling pressure described above. Hereinafter, a state where the spool 151 is not moved rightward by the electric control unit and the spool 151 remains as it is positioned at the leftward is called an "OFF state" of the first solenoid valve 150, and a state where the spool 151 has moved rightward by the electric control unit is called an "ON state" of the first solenoid valve 150.

The second solenoid valve 160 is composed of a spool 161, which freely moves in the right and left directions in the housing, a spring (not illustrated) that normally presses the spool 161 to the leftward side, and a solenoid 163 secured at the rightward of the spool 161. The spool 161 is devised so as to move rightward in response to generation of a suction force in the solenoid 163 controlled by the electric control unit. At this time, the spool 161 causes a branched oil line 315 of the oil line 311, which is an oil flow line of the modulator pressure, to communicate with the oil line 316, wherein the modulator pressure is outputted into the oil line 316 as the second change controlling pressure. Hereinafter, a state where the spool 161 is not moved rightward by the electric control unit and the spool 161 remains as it is positioned at the leftward side is called an "OFF state" of the second solenoid valve 160, and a state where the spool 161 has moved rightward by the electric control unit is called an "ON state" of the second solenoid valve 160.

The clutch shift valve 170 is composed of a spool 171, which is freely moves in the right and left directions in the housing, and a spring 172 that is provided at the rightward side of the spool 171 and normally presses the spool 171 to the leftward side. An oil chamber 173, which is connected with a branched oil line 317 of the oil line 305 that is an oil flow line of the first change controlling pressure, is secured at the leftward side of the spool 171, wherein it becomes possible to give the spool 171 a rightward pressing force by operating the first change controlling pressure. Also, an oil chamber 174, which is connected with a branched oil line 318 of the oil line 316 that is an oil flow line of the second change controlling pressure, is secured at the rightward side of the spool 171, wherein it becomes possible to give the spool 171 a leftward pressing force by operating the second change controlling pressure. Herein, where no signal pressure is operating on both the oil chambers 173 and 174, the spool 171 is positioned at the leftward side by the pressing force of the spring 172. However, when the first change controlling pressure operates in the oil chamber 173 from this state, the pressing force made by the first change controlling pressure overcomes the pressing force of the spring 172 to cause the spool 171 to be positioned rightward, and where the second change controlling pressure operates in the oil chamber 174, the spool 171 is positioned at the leftward side regardless of whether or not the first change controlling pressure is operating in the oil chamber 173.

The manual valve 180 is composed of a spool 181 that freely moves in the right and left directions in the housing. The spool 181 is moved in the right and left directions by manual operations of a manual shift lever (not illustrated) secured in the vicinity of the driver's seat in order to change the mode to N (Neutral), D(Drive), R(Reverse), etc. In the position "D", the working oil in the oil line 319, which is supplied through the clutch shift valve 170, is supplied from the oil line 320 to the forward clutch 65, and in the position "R", it is supplied from the oil line 321 to the rearward brake 66, whereby engagement of the clutch 65 and brake 66 is performed. In addition, in the position "N", the working oil in the oil line 319 is supplied into neither the forward clutch 65 nor the rearward brake 66 (Position shown in FIG. 1).

The lockup shift valve 190 is composed of a spool 191, which freely moves in the right and left directions in the housing, and a spring 192 that is secured at the leftward side of the spool 191 and normally presses the spool 191 rightward. An oil chamber 193 that is connected with an oil line 322 communicating with the clutch shift valve 170 is provided at the rightward side of the spool 191, wherein the first change controlling pressure and the second change controlling pressure are caused to operate to give the spool 191 a leftward pressing force. Hereinafter, the position (rightward position) of the spool 191 where neither the first change controlling pressure nor the second change controlling pressure operates in the oil chamber 193 is called a "position where the lockup mechanism does not operate", and the position (leftward position) of the spool 191 where any one of the first change controlling pressure and the second change controlling pressure position operates in the oil chamber 193 is called a "position where the lockup mechanism operates".

A lockup control valve 200 is composed of a spool 201, which freely moves in the right and left directions in the housing, and a spring 202 that is secured at the leftward side of the spool 201 and normally presses the spool 201 rightward. The above-described control pressure (control pressure generated and regulated by the linear solenoid valve 140) supplied through oil lines 313 and 323 operates in the oil chamber 203 secured at the rightward side of the spool 201 to given the spool 201 a leftward pressing force. The lockup control valve 200 regulates the pressure of surplus oil from the regulator valve 110, which is supplied through the oil lines 303 and 324, and supplies engagement control pressure of the lockup mechanism 50 into the oil line 325. However, the engagement control pressure is pressure responsive to the position of the spool 201, which can be controlled by controlling the intensity of control pressure from the above-described linear solenoid valve 140 that controls the position of the spool 201, that is, controlling the amount of drive of the spool 141 of the linear solenoid valve 140, which is carried out by the electric control unit.

Herein, (1) where the first solenoid valve 150 is OFF and the second solenoid valve 160 is also OFF, since no signal pressure operates in both oil chambers 173 and 174 of the clutch shift valve 170, the spool 171 of the same valve 170 is positioned at the leftward side as described above. At this time, the branched oil line 326 of the oil line 313 is caused to communicate with the oil line 319 connected with the manual valve 180, and control pressure generated and regulated by the linear solenoid valve 140 is supplied into the forward clutch 65 and rearward brake 66 (hereinafter called "friction engagement elements"). Therefore, the engagement control of the friction engagement elements (control to optimize the engagement capacity) is enabled by the electric control unit through the linear solenoid valve 140.

Further, although, at this time, the clutch shift valve 170 causes the branched oil line 327 of the oil line 316 to communicate with the oil line 322, the second solenoid valve 160 is OFF and no second change controlling pressure is provided. Therefore, the spool 191 of the lockup shift valve 190 is pressed by the spring 192 and is positioned at the rightward side (that is, positioned at the position where the lockup mechanism does not operate). At this time, the branched oil line 328 of the oil line 303 is caused to communicate with the oil line 329 connected to the cover side oil chamber 53 of the lockup mechanism 50 while the oil line 330 connected with the turbine side oil chamber 52 of the lockup mechanism 50 is caused to communicate with the oil line 331. Accordingly, surplus oil of the regulator valve 110 is supplied to the cover side oil chamber 53 through the oil lines 303, 328 and 329 while the working oil in the torque converter 30 is discharged to an oil cooler through the oil lines 330 and 331 or through the oil lines 332 and 333 or through the oil lines 332 and 334.

The pressure in the cover side oil chamber 53 due to such flows of the working oil becomes higher than that in the turbine side oil chamber 52, wherein a difference in pressure occurs between both oil chambers 52 and 53, and the lockup clutch piston 51 is pressed to the turbine runner 32 side. For this reason, the lockup clutch piston 51 is not engaged with the converter cover 34, wherein the lockup mechanism 50 is caused to enter a non-operated state. In addition, the crankshaft Es is not coupled with the input shaft 20 in this state (or the coupling thereof is cancelled). Also, at this time, since the first solenoid valve 150 is OFF, the first change controlling pressure does not operate in the oil chamber 117 of the regulator valve 110, wherein a state corresponding to a high pressure is brought about, and the line pressure in the oil line 302 is set to a high line pressure.

Also, (2) where the first solenoid valve 150 is ON and the second solenoid valve 160 is OFF, the first change controlling pressure operates in the oil chamber 173 of the clutch shift valve 170, and no second change controlling pressure operates in the oil chamber 174. Therefore, the spool 171 is positioned at the rightward side. At this time, the branched oil line 335 of the oil line 309, which is a flow line of the line pressure, is caused to communicate with the oil line 319 connected with the manual valve 180. Accordingly, the line pressure is provided to the friction engagement elements, wherein a completely engaged state is maintained (no engagement control of the friction engagement elements is available).

Also, since, at this time, the clutch shift valve 170 causes the branched oil line 336 of the oil line 306 to communicate with the oil line 322, the first change controlling pressure outputted from the first solenoid valve 150 operates in the oil chamber 193 of the lockup shift valve 190, and the spool 191 of the same valve 190 is positioned at the leftward side (that is, positioned at the position where the lockup mechanism operates). At this time, since the oil line 328 is caused to communicate with the oil line 330, and the oil line 325 is caused to communicate with the oil line 329, surplus oil from the regulator valve 110 is supplied to the cover side oil chamber 53 through the oil lines 303, 324, 325, and 329, and at the same time, is also supplied to the turbine side oil chamber 52 through the oil lines 303, 328 and 330. Concurrently, the working oil in the torque converter 30 is discharged to the oil cooler through the oil lines 332 and 333 or through the oil lines 332 and 334.

Thus, although working oil is supplied to both oil chambers 52 and 53 through different oil channels at the same time, the working oil pressure (back pressure of the torque converter) supplied to the cover side oil chamber 53 is engagement control pressure that is produced and regulated in the lockup control valve 200, and becomes lower than the working oil pressure (the inner pressure of the torque converter) that is provided from the regulator valve 110 directly to the turbine side oil chamber 52. Therefore, a difference in pressure occurs between both oil chambers 52 and 53, wherein the lockup clutch piston 51 is pressed to the converter cover 34 side. For this reason, the lockup clutch piston 51 is engaged with the converter cover 34, and the lockup mechanism 50 is caused to enter its operated state. In addition, in this state, the crankshaft Es and input shaft 20 are coupled to each other.

Herein, since the engagement control pressure provided to the cover side oil chamber 53 is controllable by the control pressure that is produced and regulated by the linear solenoid valve 140, the engagement of the lockup mechanism 50 can be controlled (the engagement capacity can be optimally controlled) by the electric control unit via the linear solenoid valve 140. In detail, the larger the above-described control pressure is made, the more the quantity of the leftward shift of the spool 201 of the lockup control valve 200 becomes, wherein the pressure of the working oil provided to the cover side oil chamber 53 is lowered in line therewith, wherein it becomes possible to increase the engagement capacity of the lockup mechanism 50 (that is, the engagement capacity between the lockup clutch piston 51 and the converter cover 34).

Further, in the case of (2), since the first solenoid valve 150 is ON, the first change controlling pressure operates in the oil chamber 117 of the regulator valve 110, and a state corresponding to low pressure is brought about, wherein the line pressure in the oil line 302 is set to a low line pressure. The low line pressure is provided to the friction engagement elements and is used to completely engage the same. Therefore, it is necessary that the low line pressure is maintained at a predetermined level that satisfies such a condition, and it is necessary that the low line pressure is high enough to smoothly perform a normal speed change action (operation of the pulleys 71 and 75) in a constant running state (a high-speed running state).

In addition, (3) where the first solenoid valve 150 is ON and the second solenoid valve 160 is also ON, the first change controlling pressure operates in the oil chamber 173 of the clutch shift valve 170, and at the same time the second change controlling pressure operates in the oil chamber 174. Therefore, the spool 171 of the same valve 170 is positioned at the leftward side. At this time, as in the case of the above-described (1), since the branched oil line 326 of the oil line 313 is caused to communicate with the oil line 319 connected with the manual valve 180, and control pressure that is produced and regulated by the linear solenoid valve 140 is provided to the friction engagement elements, it becomes possible to perform engagement control of the friction engagement elements by the electric control unit via the linear solenoid valve 140.

Also, since the clutch shift valve 170 causes the branched oil line 327 of the oil line 316 to communicate with the oil line 322, the second change controlling pressure outputted from the second solenoid valve 160 operates in the oil chamber 193 of the lockup shift valve 190, and the spool 191 of the same valve 190 is positioned at the leftward side (that is, positioned at the position where the lockup mechanism operates). Therefore, since the engagement control pressure provided to the cover side oil chamber 53 becomes controllable by the control pressure that is produced and regulated by the linear solenoid valve 140 as in the case of the above-described (2), the engagement control of the lockup mechanism 50 can be performed by the electric control unit via the linear solenoid valve 140 (using the same control pressure). Also, since the first solenoid valve 150 is ON, the first change controlling pressure operates in the oil chamber 117 of the regulator valve 110, and the line pressure in the oil line 302 is set to the low line pressure as in the case of (2).

Further, (4) where the first solenoid valve 150 is OFF and the second solenoid valve 160 is ON, no first change controlling pressure operates in the oil chamber 173 of the clutch shift valve 170. However, the second change controlling pressure operates in the oil chamber 174. Therefore, the spool 171 is positioned at the leftward side, whereby, as in the case of the above-described (1) or (3), since the branched oil line 326 of the oil line 313 is caused to communicate with the oil line 319 connected with the manual valve 180, and the control pressure that is produced and regulated by the linear solenoid valve 140 is provided to the friction engagement elements, the engagement of the friction engagement elements is controlled by the electric control unit via the linear solenoid valve 140.

In addition, at this time, since the clutch shift valve 170 causes the branched oil line 327 of the oil line 316 to communicate with the oil line 322, the second change controlling pressure outputted from the second solenoid valve 160 operates in the oil chamber 193 of the lockup shift valve 190, wherein the spool 191 of the same valve 190 is positioned at the leftward side (that is, positioned at the position where the lockup mechanism operates). Accordingly, the engagement control pressure provided to the cover side oil chamber 53 becomes controllable by the control pressure that is produced and regulated by the linear solenoid valve 140 as in the case of the above-described (2) or (3), and the engagement of the lockup mechanism 50 can be controlled by the electric control unit via the linear solenoid valve 140 (using the same control pressure) as in the case of (3). However, herein, differing from the case of (3), since the first solenoid valve 150 is OFF, the first change controlling pressure does not operate in the oil chamber 117 of the regulator valve 110, wherein, as in the case of (1), the line pressure in the oil line 302 is set to high line pressure.

Table of FIG. 4 summarizes the above description. As shown in Table, the lockup mechanism 50 is disengaged (not operated) by turning OFF both the first solenoid valve 150 and the second solenoid valve 160 by the electric control unit as in the case of the above-described (1), wherein no engagement can be controlled. However, the engagement of the friction engagement elements can be controlled by the electric control unit via the linear solenoid valve 140. At this time, the line pressure is set to the high line pressure (In addition, the quantity of supply of the working oil set at the high pressure corresponds to a large capacity in the embodiment according to the second aspect of the invention described below). Therefore, such setting is performed in the case where it is necessary to relieve the shock of engagement by gradually engaging the friction engagement elements that are in an disengaged state when changing the manual shift lever from the position "N" to "D" (or from "N" to "R") when starting a vehicle, and/or in the running state where a high-pressure working oil is required to operate the speed changer CVT without performing any lockup although the torque is increased by the torque converter 30 when the load after starting the vehicle is large and the number of output revolutions (vehicle velocity) is small.

In addition, as in the case of the above-described (2), the friction engagement elements are caused to enter a completely engaged state by turning ON the first solenoid valve 150 and turning off the second solenoid valve 160 by the electric control unit, and the engagement cannot be controlled. But, the lockup mechanism 50 is operated, wherein the engagement can be controlled by the electric control unit via the linear solenoid valve 140. At this time, the line pressure is set to the low line pressure (Also, the quantity of supply of the working oil set at the low line pressure corresponds to a large capacity in the embodiment according to the second aspect of the invention described later). Accordingly, such setting is performed in a running mode in which, for example, although the load is comparatively small, the number of output revolutions is large to some degree as in a low-speed running mode, and the friction engagement elements remain completely engaged, it is necessary that the engagement capacity of the lockup mechanism 50 is varied from zero to a value corresponding to the engine torque, and further no high pressure is required to operate the speed changer CVT.

Furthermore, in the case of the above-described (3), it becomes possible to control both the engagement of the lockup mechanism 50 and engagement of the friction engagement elements, using the same control value (the control pressure that is produced and regulated by the linear solenoid valve 140), by turning ON both the first solenoid valve 150 and second solenoid valve 160 by the electric control unit. At this time, as in the case of (2), since the line pressure is set to the low line pressure, such setting is performed in a running mode where, since the load is low as in a constant (high speed) running state, etc., and the number of output revolutions is large, it is necessary that the engagement capacity of the lockup mechanism 50 is varied so as to correspond to the engine torque, and at the same time, the engagement capacity of the friction engagement elements is varied in line with the same change in the engagement capacity of the lockup mechanism 50, and no high pressure is required to operate the speed changer CVT. However, it is preferable that, with respect to the same control pressure, the engagement capacity of the lockup mechanism 50 is smaller than the engagement capacity of the friction engagement elements.

Still further, as in the case of the above-described (4), it is possible to control both the engagement of the lockup mechanism 50 and engagement of the friction engagement elements by using the same control value (the control pressure that is produced and regulated by the linear solenoid valve 140) from the electric control unit as in the case of the above-described (3) by turning OFF the first solenoid valve 150 and turning ON the second solenoid valve 160 by the electric control unit. However, herein, differing from the case of (3), since the high line pressure is set as the line pressure, such setting is performed, for example, where a quick speed reduction is carried out from a constant running state, that is, both the pulleys 71 and 75 are quickly operated by supplying a large capacity and high-pressure of working oil to cause the speed change ratio to be returned to the LOW side (in particular, where the vehicle is intended to stop after a quick speed reduction).

Thus, in the apparatus for a power transmission device according to the first aspect of the invention, a mode in which the lockup mechanism 50 is caused to operate (a state where the crankshaft Es of the engine is coupled to the input shaft 20 of the speed changer CVI), and the pressure (line pressure) of the working oil used to actuate the speed changer CVT is set to the low pressure, and a mode in which the lockup mechanism 50 is caused not to be operated (a state where the crankshaft Es is not coupled to the input shaft 20), and the pressure of the above-described working oil is set to the high pressure are changed over by changing the output of two types of signal pressures. Therefore, the latter mode is selected when the load is large and the number of output revolutions (the running velocity of the vehicle) of the speed changer CVT is small (this corresponds to the case of the above-described (1)), and the former mode is selected where the load is small and the number of output revolutions of the speed changer CVT is large (this corresponds to the cases of the above-described (2) and (3)), whereby the loss of power can be reduced, and the fuel consumption can be improved. Further, the output of the above-described signal pressure can be changed by only a single solenoid valve (the first solenoid valve 150), which is capable of outputting ON and OFF signal pressures, and its controller (electric control unit). The construction is simple.

Figure 5:
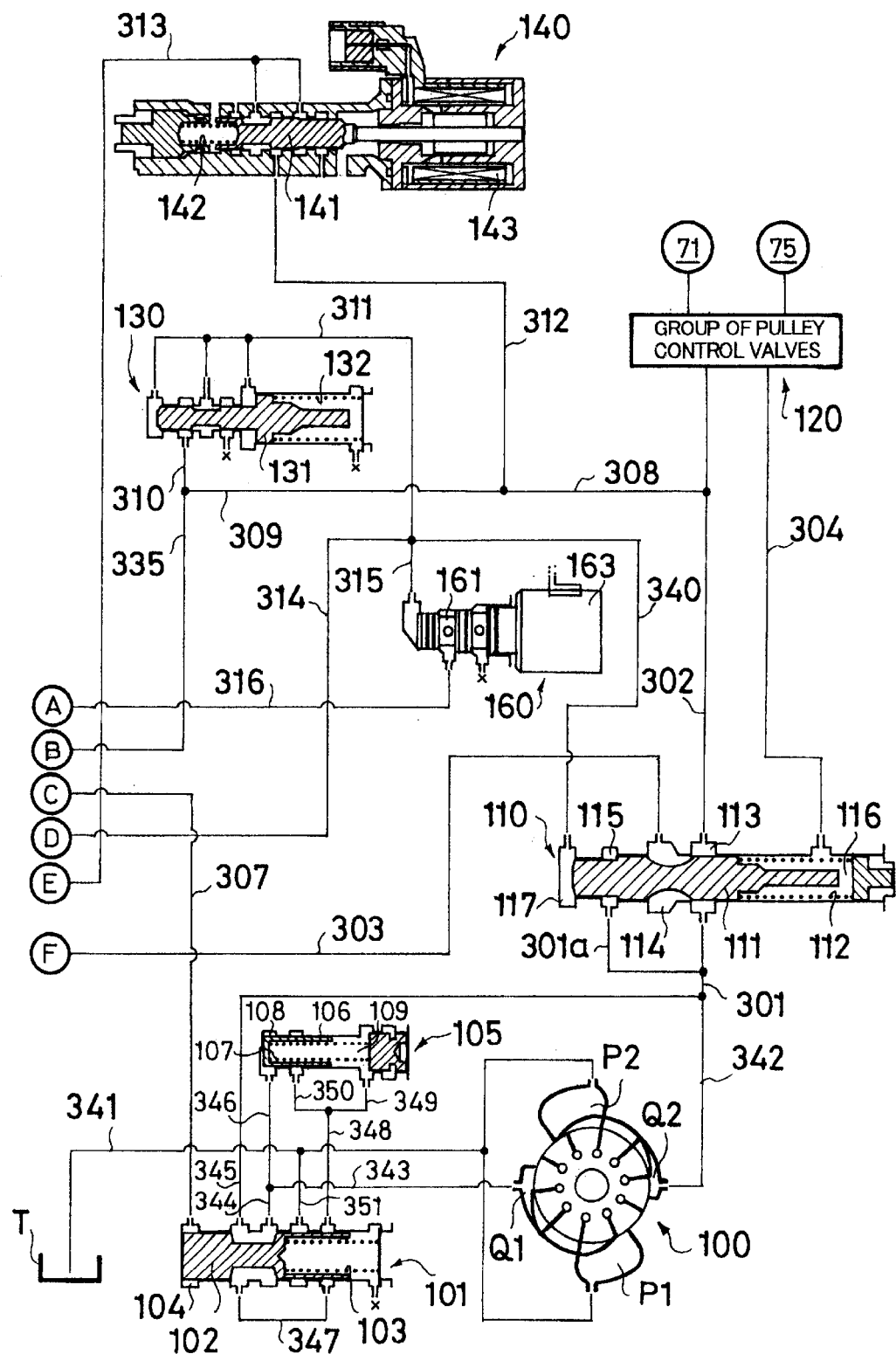
FIG. 5 is a diagram of hydraulic circuits showing the configuration of an apparatus for controlling a power transmission device according to the second aspect of the invention.

Next, a description is given of an embodiment of the apparatus for controlling a power transmission device according to the second aspect of the invention. The object in which the controlling apparatus is employed is the same as the power transmission device for a vehicle shown in FIG. 3 described above, and overlapping description thereof is omitted. FIG. 1 and FIG. 5 are hydraulic circuit diagrams showing the configuration of the apparatus for controlling a power transmission device according to the second aspect of the invention. The configuration pertaining to FIG. 1 is the same as that of the apparatus for controlling a power transmission device according to the first aspect of the invention described above. In both the drawings (FIG. 1 and FIG. 5), the encircled letters "A" through "F" indicate that oil lines are connected to each other.

The configuration of the controlling apparatus according to the second aspect of the invention has many parts that are common to the controlling apparatus according to the first aspect of the invention. However, they differ from each other in the following three points: (1) the hydraulic pump 100 is made into a vane pump that is provided with two suction ports and two discharge ports, and at the same time, the discharge capacity change valve 101 and check valve 105 are provided, wherein the discharge capacity of the hydraulic pump 100 is made variable (that is, made into a capacity change type hydraulic pump). (Hereinafter, the hydraulic pump 100, discharge capacity change valve 101, check valve 105, and their related oil lines are called a "working oil supply device" as a whole); (2) an oil line 307 that is a flow line of the first change controlling pressure outputted from the first solenoid valve 150 is not connected to the oil chamber 117 of the regulator valve 110, but to the oil chamber 104 of the above-described discharge capacity change valve 101; and (3) modulator pressure that is regulated and obtained by the modulator valve 130 is supplied to the oil chamber 117 of the regulator valve 110 via the branched oil line 340 of the oil line 311 to cause a rightward pressing force to be given to the spool 111.

First, a description is given of the working oil supply device. The hydraulic pump 100 that constitutes the working oil supply device is provided with the first and second suction ports P1 and P2 and the first and second discharge ports Q1 and Q2 as shown in FIG. 5. Both the first and second suction ports P1 and P2 are caused to communicate with the oil tank T via an oil line 341, and the second discharge port Q2 is caused to communicate with the above-described oil line 301 connected with the regulator valve 110 via an oil line 342.

The discharge capacity change valve 101 is composed of a spool 102 that freely moves in the right and left directions in the housing, and a spring 103 that is provided at the rightward side of the spool 102 and normally presses the spool 102 in the leftward direction. The oil line 307 connected with the first solenoid valve 150 is connected to the oil chamber 104 secured at the leftward side of the spool 102 as described above, wherein the spool 104 is given a pressing force by supplying the first change controlling pressure outputted when the first solenoid valve 150 is turned ON, and can be positioned at the rightward side. The branched oil line 344 of the oil line 343 connected with the first discharge port Q1 of the hydraulic pump 100 is connected to the discharge capacity change valve 101, and although the oil line 344 is caused to communicate with the oil line 345 connected with the oil line 301 when the spool 102 is positioned at the leftward side, the communication of the oil line 344 with the oil line 345 is interrupted by the spool 102 when the spool 102 is positioned at the rightward side.

The check valve 105 is composed of a spool 106, which freely moves in the right and left directions in the housing, and a spring 107 that is provided at the rightward side of the spool 106 and normally presses the spool 106 to the leftward side. The branched oil line 346 of the oil line 343 is connected with the oil chamber 108 secured at the leftward side of the spool 106, wherein the working oil pressure that is discharged from the first discharge port Q1 of the hydraulic pump 100 normally operates to give a rightward pressing force to the spool 106. (However, as described later, the pressing force does not operate when the first discharge port Q1 is caused to communicate with the oil tank T).

Herein, when the first solenoid valve 150 is OFF and the first change controlling pressure does not operate in the oil chamber 104 of the discharge capacity change valve 101, the spool 102 of the same valve 101 is positioned at the leftward side by the pressing force of the spring 103. But, at this time, since the oil line 344 is caused to communicate with the oil line 345 as described above, the working oil discharged from the first discharge port Q1 of the hydraulic pump 100 comes in confluence with the working oil discharged from the second discharge port Q2, and is supplied into the oil line 301. Hereinafter, the working oil supply capacity from the hydraulic pump 100 is called a "large capacity" when the working oil discharged from the first discharge port Q1 comes in confluence with the working oil discharged from the second discharge port Q2 and is supplied into the oil line 301 as described above, wherein the position (leftward position) of the spool 102 is called a "position corresponding to a large capacity".

In addition, the working oil in the oil lines 343 and 344 communicates from the oil line 347 to the oil line 348. However, the branched oil line 349 of the oil line 348 communicates with the spring chamber 109 of the check valve 105. Accordingly, a leftward pressing force operates on the spool 106 of the same valve 105. On the other hand, the working oil in the same oil line 343 operates in the oil chamber 108 of the check valve 105 via the oil line 346. Therefore, these leftward and rightward pressing forces are balanced to each other although a rightward pressing force operates on the spool 105, the spool 106 is finally pressed to the leftward side by the pressing force of the spring 107. (Also, in this state, the branched oil line 350 of the oil line 348 does not communicate with the oil line 346).

On the other hand, when the first solenoid valve 150 is ON and the first change controlling pressure operates in the oil chamber 104 of the discharge capacity change valve 101, the rightward pressing force resulting from the first change controlling pressure overcomes the leftward pressing force made by the spring 103 to cause the spool 102 of the same valve 101 to be positioned at the rightward side. At this time, the communication of the oil line 344 with the oil line 345 is interrupted, and simultaneously since the oil line 344 is caused to communicate with the branched oil line 351 of the oil line 341 connected to the oil tank T, the working oil discharged from the first discharge port Q1 of the hydraulic pump 100 is returned to the oil tank T. Therefore, the quantity of the working oil supplied into the oil line 301 comes to only the capacity of the second discharge port Q2, wherein the capacity of the working oil supplied from the hydraulic pump 100 to the oil line 301 is reduced to half in comparison with the above-described large capacity. Hereinafter, the working oil supply capacity from the hydraulic pump 100 is called a "small capacity" when only the working oil that is discharged from the first discharge port Q1 is supplied into the oil line 301. At this time, the position of the spool 102 is called a "position (rightward position) corresponding to the small capacity". Also, the output of the first change controlling pressure from the first solenoid valve 150 corresponds to the output of the first signal pressure in the scope of Claims, wherein the non-output of the first change controlling pressure from the first solenoid valve 150 corresponds to the output of the second signal pressure in the scope of claims.

Further, only the atmospheric pressure or so operates in the oil chamber 108 of the check valve 105 (because the oil line 343 communicates with the oil tank T) while the discharge pressure from the first discharge port Q1 operates in the spring chamber 109 of the check valve 105 through the oil lines 343, 344, 347, 348 and 349, no rightward pressing force operates on the spool 106. Accordingly, the spool 106 will be pressed to the leftward side. For this reason, there is no case where the oil line 346 communicates with the oil line 350, and the second discharge port Q2 communicates with the oil tank T. Accordingly, the working oil that is discharged from the second discharge port Q2 is maintained at a predetermined pressure.

Also, in a transient state where the spool 102 of the discharge capacity changing valve 101 is changed from the left position to the right position, the oil line 344 is closed by the spool 102, and high pressure instantaneously arises in the oil line 343. But, at this time, the high pressure operates from the oil line 346 into the oil chamber 108 of the check valve 105 and presses the spool 106 of the same valve 105 to the rightward side, whereby since the oil line 346 is caused to communicate with the oil line 350, the high pressure that occurred in the oil line 343 is discharged into the oil line 301 through oil lines 346, 350, 348, 347 and 345. Therefore, fluctuation of the discharge pressure in line with a positional change of the discharge capacity change valve 101 can be suppressed to be small, and a bursting of the oil lines can be prevented from occurring.

In such a configuration, as in the case of (1) in the above-described first embodiment, where the first solenoid valve 150 is OFF and the second solenoid valve 160 is OFF, the spool 171 of the clutch shift valve 170 is positioned at the leftward side, and the oil line 326 is caused to communicate with the oil line 319 connected with the manual valve 180. Also, control pressure that is produced and regulated by the linear solenoid valve 140 is provided to the friction engagement elements, and it becomes possible to control the engagement of the friction engagement elements (to optimize the engagement capacity) by the electric control unit through the linear solenoid valve 140. At the same time, since no second change controlling pressure is outputted from the second solenoid valve 160, the spool 191 of the lockup shift valve 190 is positioned at the rightward position (that is, positioned at the position where the lockup mechanism does not operate), and the lockup mechanism 50 is disengaged (not operated) by the above-described reason. In addition, the first change controlling pressure does not operate in the oil chamber 104 of the discharge capacity change valve 101 since the first solenoid valve 150 is OFF, and the spool 102 of the same valve 101 is positioned at the leftward position corresponding to the large capacity, and the hydraulic pump 100 provides a large capacity of working oil.

Next, as in the case of (2) in the above-described first embodiment, where the first solenoid valve 150 is ON and the second solenoid valve 160 is OFF, the spool 171 of the clutch shift valve 170 is positioned at the rightward side, and the oil line 335 that is a flow line of the line pressure is caused to communicate with the oil line 319 connected with the manual valve 180, wherein the line pressure is provided to the friction engagement elements, and a completely engaged state is maintained (no engagement of the friction engagement elements is available). At the same time, the first change controlling pressure that is outputted from the first solenoid valve 150 operates in the oil chamber 193 of the lockup shift valve 190, and the spool 191 of the same valve 190 is positioned at the leftward side (that is, positioned at the position where the lockup mechanism operates). Therefore, the lockup mechanism 50 is operated, wherein it becomes possible to control the engagement of the lockup mechanism 50 (control to optimize the engagement capacity) by the electric control unit through the linear solenoid valve 140. Also, at this time, the first change controlling pressure operates in the oil chamber 104 of the discharge capacity change valve 101 since the first solenoid valve 150 is ON, and the spool 102 of the same valve 101 is positioned at the rightward position corresponding to the small capacity, wherein the hydraulic pump 100 provides working oil at the small capacity. In addition, at this time, it is necessary that the quantity of supply (small capacity) is secured at a quantity by which only normal speed change operation (operation of the pulleys 71 and 75) excluding quick speed reduction from a constant running mode can be carried out.

Also, as in the case of (3) in the above-described first embodiment, where the first solenoid valve 150 is ON and the second solenoid valve 160 is also ON, since the spool 171 of the clutch shift valve 170 is positioned at the leftward position, the oil line 326 is caused to communicate with the oil line 319 connected with the manual valve 180, and control pressure that is produced and regulated by the linear solenoid valve 140 is provided to the friction engagement elements, the engagement of the friction engagement elements can be controlled by the electric control unit through the linear solenoid valve 140, and at the same time, the second change controlling pressure that is outputted from the second solenoid valve 160 operates in the oil chamber 193 of the lockup shift valve 190, wherein the spool 191 of the same valve 190 is positioned at the leftward side (that is, positioned at the position where the lockup mechanism operates), and the engagement controlling pressure that is provided to the cover side oil chamber 53 can be made controllable by the control pressure that is produced and regulated by the linear solenoid valve 140. Therefore, the engagement of the lockup mechanism 50 can be controlled by the electric control unit through the linear solenoid valve 140 (using the same control pressure). Also, since the first solenoid valve 150 is ON at this time, the first change controlling pressure operates in the oil chamber 104 of the discharge capacity change valve 101, and the spool 102 is positioned at the rightward position corresponding to the small capacity, wherein the hydraulic pump 100 provides working oil at the small capacity.

Still further, in the case of (4) in the above-described first embodiment, where the first solenoid valve 150 is OFF and the second solenoid valve 160 is ON, the spool 171 of the clutch shift valve 170 is positioned at the leftward side, the oil line 326 is caused to communicate with the oil line 319 connected with the manual valve 180, and control pressure that is produced and regulated by the linear solenoid valve 140 is provided to the friction engagement elements. Therefore, the engagement of the friction engagement elements can be controlled by the electric control unit, and at the same time, the second change controlling pressure that is outputted from the second solenoid valve 160 operates in the oil chamber 193 of the lockup shift valve 190, wherein the spool 191 of the same valve 190 is positioned at the leftward side (that is, positioned at the position where the lockup mechanism operates), and the engagement controlling pressure provided to the cover side oil chamber 53 can be made controllable by the control pressure that is produced and regulated by the linear solenoid valve 140. Accordingly, the engagement of the lockup mechanism 50 can be controlled by the electric control unit through the linear solenoid valve 140. However, differing from the case of (3), since the first solenoid valve 150 is OFF, the first change controlling pressure does not operate in the oil chamber 104 of the discharge capacity changing valve 101, and the spool 102 is positioned at the leftward position corresponding to the large capacity, wherein as in the case of (1), the hydraulic pump 100 supplies working oil at the large capacity.

Table shown in FIG. 6 summarizes the above description. As shown in the Table, as in the case of the above-described (1), the lockup mechanism 50 is disengaged (not operated) by performing such setting by which both the first solenoid valve 150 and the second solenoid valve 160 are turned OFF from the electric control unit, and no engagement control can be performed. However, the engagement of the friction engagement elements can be controlled by the electric control unit through the linear solenoid valve 140. At this time, since the hydraulic pump 100 is set so that it can supply working oil at the large capacity (the oil pressure of the working oil corresponds to the high line pressure in the embodiment according to the first aspect of the invention described above), such setting is performed in the case where it is necessary to relieve the shock of engagement by gradually engaging the friction engagement elements that are in an disengaged state when changing the manual shift lever from the position "N" to "D" (or from "N" to "R") when starting a vehicle, and/or in the running state where a large capacity of working oil is required to operate the speed changer CVT without performing any lockup although the torque is increased by the torque converter 30 when the load after starting the vehicle is large and the number of output revolutions (vehicle velocity) is small.

Also, in the case of the above-described (2), the friction engagement elements enter a completely engaged state by performing such setting by which the first solenoid valve 150 is turned ON by the electric control unit and the second solenoid valve 160 is turned OFF thereby, and no engagement control thereof is possible. However, the lockup mechanism 50 is operated, wherein the engagement control thereof can be performed by the electric control unit through the linear solenoid valve 140. At this time, the hydraulic pump 100 is set so that it can provide working oil at the small capacity (also, the pressure of the working oil corresponds to the high line pressure in the embodiment according to the first aspect of the invention described above). Accordingly, such setting is performed in a running mode in which, for example, although the load is comparatively small, the number of output revolutions is large to some degree as in a low-speed running mode, and the friction engagement elements remain completely engaged, it is necessary that the engagement capacity of the lockup mechanism 50 is varied from zero to a value corresponding to the engine torque, and further no large capacity of the working oil is required to operate the speed changer CVT.

Furthermore, in the case of the above-described (3), it becomes possible to control both the engagement of the lockup mechanism 50 and engagement of the friction engagement elements, using the same control value (the control pressure that is produced and regulated by the linear solenoid valve 140), by turning ON both the first solenoid valve 150 and second solenoid valve 160 by the electric control unit. At this time, as in the case of (2), since the working oil of the hydraulic pump 100 is set so that it is supplied at the small capacity, such setting is performed in a running mode where, since the load is low as in a constant (high speed) running state, etc., and the number of output revolutions is large, it is necessary that the engagement capacity of the lockup mechanism 50 is varied so as to correspond to the engine torque, and at the same time, the engagement capacity of the friction engagement elements is varied in line with the same change in the engagement capacity of the lockup mechanism 50, and no large capacity of working oil is required to operate the speed changer CVT. (It is preferable that, with respect to the same control pressure, the engagement capacity of the lockup mechanism 50 is smaller than the engagement capacity of the friction engagement elements).

Still further, as in the case of the above-described (4), it is possible to control both the engagement of the lockup mechanism 50 and engagement of the friction engagement elements by using the same control value (the control pressure that is produced and regulated by the linear solenoid valve 140) from the electric control unit as in the case of the above-described (3), by turning OFF the first solenoid valve 150 and turning ON the second solenoid valve 160 by the electric control unit. However, herein, differing from the case of (3), since the hydraulic pump 100 is set so that it can provide working oil at the large capacity, such setting is performed, for example, where a quick speed reduction is carried out from a constant running state, that is, both the pulleys 71 and 75 are quickly operated by supplying a large capacity and high-pressure of working oil to cause the speed change ratio to be returned to the LOW side (in particular, where there is an intention to make a stop after a quick speed reduction).

Thus, in the apparatus for a power transmission device according to the second aspect of the invention, a mode in which the lockup mechanism 50 is caused to operate (a state where the crankshaft Es of the engine is coupled to the input shaft 20 of the speed changer CVT), and the working oil used to actuate the speed changer CVT is supplied at a capacity smaller than that of the hydraulic pump 100, and a mode in which the lockup mechanism 50 is caused not to be operated (a state where the crankshaft Es is not coupled to the input shaft 20), and the above-described working oil is supplied at a capacity larger than that of the hydraulic pump 100 are changed over by changing the output of two types of signal pressures. Therefore, the latter mode is selected when the load is large and the number of output revolutions (the running velocity of the vehicle) of the speed changer CVT is small (this corresponds to the case of the above-described (1)), and the former mode is selected where the load is small and the number of output revolutions of the speed changer CVT is large (this corresponds to the cases of the above-described (2) and (3)), whereby the loss of power can be reduced, and the fuel consumption can be improved. Further, the output of the above-described signal pressure can be changed by only a single solenoid valve (the first solenoid valve 150), which is capable of outputting ON and OFF signal pressures, and its controller (electric control unit). The construction is simple.

Although descriptions were given of embodiments of the apparatus for controlling a power transmission device according to the invention, the scope of the invention is not limited to the above-described scope. For example, the invention according to the above-described embodiments applies to a power transmission device constructed so that it is provided with a belt-type step-free speed changer mechanism and a forward/rearward changer mechanism. But, the application of the invention is not limited to such a construction. The invention is applicable to a power transmission device constructed so that a speed changer mechanism consisting of a plurality of clutches and brakes is employed, which carries out engagement operations between planetary gear units and members instead of the belt-type step-free speed changer mechanism and forward/rearward changer mechanism. In such a power transmission device, where the load is large and the number of output revolutions of a speed changer is small, a high pressure and large capacity of working oil is required to actuate the power transmission device (engagement operations of the above-described plurality of clutches and brakes), wherein similar effects can be brought about a low pressure and small capacity of working oil is enough where the load is small and the number of output revolutions is large to some degree. Furthermore, the power transmission device is employed for a vehicle in the above-described embodiments. However, the invention is not limited to a vehicle, but it may be employed in other machinery.

Figure 7:
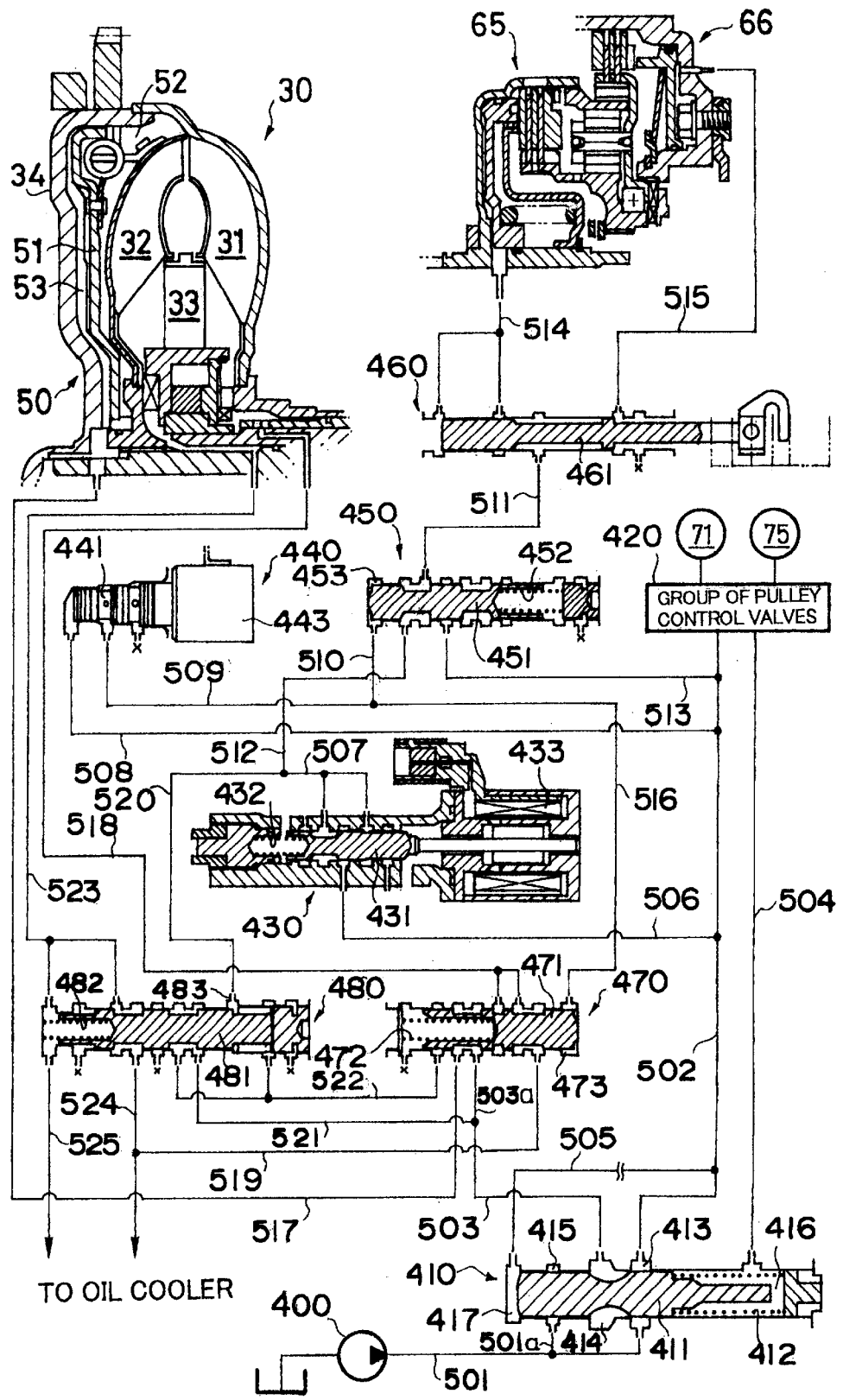
FIG. 7 is a diagram of hydraulic circuits showing the configuration of an apparatus for controlling a power transmission device according to the third aspect of the invention.

Next, a description is given of still another embodiment of the apparatus for controlling a power transmission device according to the third aspect of the invention. An object in which the controlling apparatus is employed is the same power transmission device for a vehicle shown in FIG. 3 described above. Overlapping description thereof is omitted. FIG. 7 shows a part of the configuration of the controlling apparatus for the power transmission device for a vehicle. The controlling apparatus includes a hydraulic pump 400, a regulator valve 410, a group of pulley controlling valves 420, a linear solenoid valve 430, a solenoid valve 440, a clutch shift valve 450, manual valve 460, a lockup shift valve 470, a lockup control valve 480, and an electric control unit (not illustrated in FIG. 7), etc., in addition to a torque converter 30, a drive side pulley 71, a driven side pulley 75, a forward clutch 65, a rearward brake 66 shown in FIG. 3. Herein, the operations of the linear solenoid valve 430, solenoid valve 440, and a plurality of linear solenoid valves (not illustrated) included in the group of the pulley controlling valves 420 are controlled by the electric control unit on the basis of information such as the number of revolutions of the engine, the degree of throttle openness, vehicle velocity, temperature of working oil, etc., that are detected by detectors (not illustrated).

The regulator valve 410 is composed of a spool 411, which freely moves in the right and left directions in the housing, and a spring 412 that is secured at the rightward side of the spool 411 and normally presses the spool 411 to the leftward side. An oil chamber 413 is provided in the vicinity of the central portion of the regulator valve 410, and the oil chamber 413 causes the oil line 501 connected to the hydraulic pump 400 to communicate with the oil line 502 connected to the group of pulley control valves 420. Therefore, while the working oil discharged from the hydraulic pump 400 flows into the group of pulley control valves 420 via the oil chamber 413, the working oil in the oil line 501 enters the oil chamber 415 through the branched oil line 501a and provides the spool 411 with a rightward pressing force. Accordingly, the spool 411 causes the oil chamber 413 and the oil chamber 414 to communicate with each other at the position where the rightward pressing force and the leftward pressing force provided by the spring 412 are balanced, wherein a part of the working oil in the oil chamber 413 is discharged from the oil line 503 as surplus oil. Therefore, the pressure in the oil line 502 is regulated at a predetermined pressure (line pressure). Also, the working oil discharged from the oil line 503 is supplied into the torque converter 30 (or the lockup mechanism 50) as described below, or is used as a lubricant oil for the respective portions of the step-free speed changer CVT.

Also, the spring chamber 416 of the regulator 410 is connected with the group of pulley controlling valves 420 through an oil line 504, wherein it is possible to cause the control pressure outputted from the group of pulley controlling valves 420 to operate on the basis of an instruction from the electric control unit. The intensity of the control pressure is established in response to the degree of throttle openness, etc. However, a leftward pressing force is produced at the spool 411 when the control pressure operates in the spring chamber 416, and the pressure in the oil line 501 is increased. Therefore, the pressure (line pressure) of the working oil, which is supplied from the oil line 502 to the group of pulley controlling valves 420, will be increased. In addition, oil pressure that is obtained by regulating the line pressure by means of other valves (omitted in FIG. 7) operates in the oil chamber 417 formed at the leftward side of the spool 411 through the oil line 505, thereby giving a rightward pressing force to the spool 411.

A group of pulley control valves 420 regulates the line pressure supplied via the oil line 502 (the pressure regulation is carried out by controlling the quantity of operation of the linear solenoid valve by the electric control unit) and actuates the drive side pulley 71 and driven side pulley 75, whereby the winding suspension radius of the metallic belt 15 is varied, and the belt-type step-free speed changer 70 performs a speed change action.

The linear solenoid valve 430 is composed of a spool 431, which freely moves in the right and left directions in the casing, a spring 432 that is secured at the leftward side of the spool 431 and normally presses the spool 431 in the rightward direction, and a solenoid 433 that is secured at the rightward side of the spool 431. The spool 431 is constructed so as to moves in the leftward direction by the distance in response to the suction force of the solenoid 433 (the suction force is controlled by the electric control unit), and the control pressure is produced by regulating the line pressure in the oil line 506 branched from the oil line 502, which is supplied into the oil line 507.

The solenoid valve 440 is composed of a spool 441, which freely moves in the right and left directions in the housing, a spring (not illustrated) that normally presses the spool 441 in the leftward direction, and a solenoid 443 that is secured at the rightward side of the spool 441. The spool 441 is constructed so as to move in the rightward direction when the solenoid 443 produces a suction force (the suction force is generated by an electric signal from the electric control unit). The line pressure in the oil line 502 operates on the left end of the spool 441 through the oil line 508, wherein when an electric signal is given from the electric control unit and the spool 441 moves in the rightward direction, the oil line 508 is caused to communicate with the oil line 509, and the line pressure is provided in the oil line 509. Hereinafter, a state where no electric signal is given from the electric control unit and the spool 451 is positioned at the leftward side is called a "OFF" state, and a state where an electric signal is given from the electric control unit and the spool 451 has moved to the rightward side is called a "ON" state. Further, an output when the solenoid valve 440 is turned ON (that is, an output of the line pressure into the oil line 509) is called an "output of ON signal pressure", and an output when the solenoid valve 440 is turned OFF (that is, a non-output of the line pressure into the oil line 509) is called an "output of OFF signal pressure".

The clutch shift valve 450 is composed of a spool 451, which freely moves in the right and left directions in the housing, and a spring 452 that is secured at the rightward side of the spool 451 and normally presses the spool 451 in the leftward direction. An oil line 510 communicated with the oil line 509 is connected to the oil chamber 453 secured at the leftward side of the spool 451, whereby the above-described ON signal pressure that is outputted when the solenoid valve 440 is turned ON is caused to operate. Herein, when the solenoid valve 440 is OFF and no ON signal pressure operates in the oil chamber 453 (that is, when OFF signal pressure operates in the oil chamber 453), the spool 451 is positioned at the leftward side by the spring 452 (this is called "the first position"). At this time, an oil line 512 branched from the oil line 507 is caused to communicate with an oil line 511 that connects the clutch shift valve 450 with the manual valve 460. On the other hand, when the ON signal pressure operates in the oil chamber 453, the spool 451 is positioned at the rightward side (this is called "the second position"), and an oil line 513 branched from the oil line 502 is caused to communicate with the above-described oil line 511.

The manual valve 460 is composed so as to have a spool 461 that freely moves in the right and left directions in the housing. The spool 461 is constructed so as to operate by a manual operation of the manual shift lever (not illustrated) that is provided in the driver's cabin. When the vehicle is caused to run forward, the spool 461 is caused to move to the leftward side to cause the oil line 511 to communicate with the oil line 514 connected to the forward clutch 65, and when the vehicle is caused to run rearward, the spool 461 is caused to move to the rightward side to cause the oil line 511 to communicate with the oil line 515 connected with the rearward clutch 66.

The lockup shift valve 470 is composed of a spool 471, which freely moves in the right and left directions in the housing, and a spring 472 that is secured at the leftward side of the spool 471 and normally presses the spool 471 to the rightward side. An oil line 516 that is caused to communicate with the above-described oil line 509 is connected to the oil chamber 473 secured at the rightward side of the spool 471, wherein the above-described ON signal pressure that is outputted when the solenoid valve 440 is turned ON is caused to operate. Herein, when the solenoid valve 440 is OFF and no ON signal pressure operates in the oil chamber 473 (that is, the OFF signal pressure operates), the spool 471 is positioned at the rightward side by the spring 472 (This is called "the second position"), and at this time, the above-described oil line 503 (and 503a) into which discharge oil from the regulator valve 410 is supplied is caused to communicate with an oil line 517 connected with the cover side oil chamber 53 of the lockup mechanism 50. At the same time, an oil line 518 connected with the turbine side oil chamber 52 of the lockup mechanism 50 is caused to communicate with an oil line 519 connected to the oil cooler. On the other hand, when the ON signal pressure operates in the oil chamber 473, the spool 471 is positioned at the leftward side (This is called "the first position"), wherein the communication of the oil line 503a with the oil line 517 is interrupted while the line 503a communicates with the oil line 518.

The lockup control valve 480 is composed of a spool 481, which freely moves in the right and left directions in the housing, and a spring 482 that is secured at the leftward of the spool 481 and normally presses the spool 481 to the rightward side. An oil line 520 branched from the above-described oil line 507 is connected to the oil chamber 483 secured at the rightward side of the spool 481, wherein control pressure produced by the linear solenoid valve 430 applies a leftward pressing force to the spool 481. The lockup control valve 480 causes the branched oil line 521 of the oil line 503 to communicate with an oil line 522 connected with the lockup shift valve 470. However, when the solenoid valve 440 is OFF and the spool 471 of the lockup shift valve 470 is positioned at the rightward side, the oil line 522 is interrupted from the spool 471. On the other hand, when the solenoid valve 440 is ON and the spool 471 of the lockup shift valve 470 is positioned at the leftward side, the oil line 522 is caused to communicate with the above-described oil line 517 connected with the cover side oil chamber 53.

In such a construction, where the solenoid valve 440 is OFF, no ON signal pressure from the solenoid valve 440 operates in the oil chamber 473 of the lockup shift valve 470 (that is, the OFF signal pressure operates therein), and since the spool 471 is positioned at the rightward side (that is, positioned at the second position), the working oil discharged from the regulator valve 410 into the oil line 503 is supplied into the cover side oil chamber 53 of the lockup mechanism 50 via the oil line 503a, lockup shift valve 470, and oil line 517. Concurrently, the working oil in the torque converter 30 is discharged to the oil cooler via the oil line 418, lockup shift valve 470, and oil line 519 or via the oil line 523, lockup control valve 480, oil lines 524 and 525. Therefore, the pressure in the cover side oil chamber 53 becomes higher than that in the turbine side oil chamber 52, and since the lockup clutch piston 51 is pressed to the turbine runner 32 side, the lockup clutch piston 51 is disengaged from the converter cover 34.

In addition, where the solenoid valve 440 is OFF, no ON signal pressure from the solenoid valve 440 operates in the oil chamber 453 of the clutch shift valve 450 (that is, the OFF signal pressure operates), and the spool 451 is positioned at the leftward side (that is, positioned at the first position). Therefore, control pressure in the oil line 507, which is produced and regulated by the linear solenoid valve 430, is supplied into the manual valve 460 via the oil line 512, clutch shift valve 450 and oil line 511. (Also, at this time, the line pressure in the oil lines 502 and 513 is interrupted by the spool 451). Therefore, it will become possible to regulate the engagement capacity of the forward clutch 65 or the rearward brake 66 to a desired amount by the amount of drive of the spool 431 of the linear solenoid valve 430.

On the other hand, when the solenoid valve 440 is ON, the ON signal pressure from the solenoid valve 440 operates in the oil chamber 453 of the clutch shift valve 450 via the oil lines 509 and 510 to cause the spool 451 to be positioned at the rightward side (that is, positioned at the second position). Accordingly, control pressure that is produced and regulated by the linear solenoid valve 430 is interrupted by the spool 451, and the line pressure in the oil line 502 is supplied into the manual valve 460 via the oil line 513, clutch shift valve 450, and oil line 511 instead thereof. For this reason, the forward clutch 65 or rearward brake 66 is maintained to be completely engaged.

Further, where the solenoid valve 440 is ON as well, the ON signal pressure from the solenoid valve 440 operates in the oil chamber 473 of the lockup shift valve 470 via oil lines 509 and 516, wherein the spool 471 is positioned at the leftward side (that is, positioned at the first position). Accordingly, oil discharged from the regulator valve 410 is supplied into the cover side oil chamber 53 of the lockup mechanism 50 via oil lines 503 and 521, lockup control valve 480, oil line 522, lockup shift valve 470, and oil line 517, and oil discharged from the regulator valve 410 is supplied into the turbine side oil chamber 52 via oil lines 503 and 503a, lockup shift valve 470, and oil line 518. At the same time, the working oil in the torque converter 30 is discharged to the oil cooler via the oil line 523, lockup control valve 480, and oil lines 524 and 525.

Herein, the spool 481 of the lockup control valve 480 is caused to move leftward in response to the control pressure that is supplied via the oil lines 507 and 520 and produced by the linear solenoid valve 430 and the working oil pressure in the oil line 521 is regulated to be low and is supplied into the oil line 522. Therefore, the pressure of the working oil that is supplied from the oil line 522 into the cover side oil chamber 53 via the lockup shift valve 470 (the pressure has a level larger than the above-described control pressure) is made lower than the pressure of the working pressure supplied into the turbine side oil chamber 52, wherein a difference occurs in pressure between both the oil chambers 52 and 53. Thereby, the lockup clutch piston 51 is pressed to the converter cover 34 side and is engaged with the converter cover 34. Herein, the higher the pressure of the working oil supplied from the linear solenoid valve 430 becomes, the more the amount of leftward travel of the above-described spool 481 becomes. In line therewith, since the pressure of the working oil supplied into the cover side oil chamber 53 becomes lower, the engagement capacity of the lockup mechanism 50 (that is, the engagement capacity of the lockup clutch piston 51 with the converter cover 34) accordingly becomes larger. Therefore, it is possible to regulate the engagement capacity of the lockup mechanism 50 to a desired quantity by varying the control pressure from the linear solenoid valve 430.

As has been made clear from the above description, although the lockup control valve 480 is a valve that amplifies the control pressure produced by the linear solenoid valve 430 (the relationship of increase and decrease is inverted) and converts it to the engagement capacity control pressure of the lockup mechanism 50, the lockup shift valve 470 can be the to be a valve that supplies the converted control pressure (the above-described engagement capacity control pressure) to the lockup mechanism 50 (the first position) or interrupts the supply thereof (the second position). Herein, the engagement control pressure of the lockup mechanism 50 means the working oil pressure that is supplied to the cover side oil chamber 53 and controls the engagement capacity between the lockup clutch piston 51 and converter cover 34. Also, the lockup mechanism 50 is disengaged, as described above, in a state where the lockup shift valve 470 interrupts the supply of the engagement capacity control pressure (that is, in a state where the spool is positioned at the second position).

In the apparatus for controlling a power transmission device according to the invention, it is possible to control the engagement capacity of the friction engagement elements (the forward clutch 65 and rearward brake 66), using the control pressure that is produced by the linear solenoid valve 430, by positioning the clutch shift valve 450 at the first position by the solenoid valve 440 and positioning the lockup shift valve 470 at the second position. At this time, although the engagement capacity control of the lockup mechanism 50 cannot be carried out by using the above-described control pressure, the engagement capacity of the friction engagement elements is controlled when amplifying the torque by the torque converter 30 when starting the vehicle (there is a fear that an excessive torque is inputted into the metallic V belt 79), and since the lockup mechanism 50 is not operated under such a situation, there is nothing disadvantageous.

On the other hand, it is possible to control the engagement capacity of the lockup mechanism 50, using the control pressure that is produced by the linear solenoid valve 430, by positioning the clutch shift valve 450 at the second position by the solenoid valve 440, and positioning the lockup shift valve 470 at the first position. At this time, the line pressure is applied to the friction engagement elements, and a completely engaged state is maintained, wherein no engagement capacity can be controlled. But, since the engagement capacity of the lockup mechanism 50 is controlled when the output of the engine is stabilized, for example, when the vehicle runs at a high speed, and when no torque is amplified by the torque converter 30. Therefore, no engagement capacity control of the friction engagement elements is necessary, and this also does not constitute any problem.

In the invention described above, the object to be controlled by the control pressure that is produced by the linear solenoid valve 430 can be changed to either of the friction engagement elements (forward clutch 65 and rearward brake 66) or the lockup mechanism 50, and furthermore, both the engagement capacity of the friction engagement elements and engagement capacity of the lockup mechanism can be controlled by a single linear solenoid valve. Therefore, no two linear solenoid valves are required in the above-described control, wherein it is possible to remarkably reduce the production costs thereof.

Also, a valve (the lockup control valve 480) that converts the control pressure produced by the linear solenoid valve 430 and produces the engagement capacity control pressure of the lockup mechanism 50 is not necessarily located at the upstream side of the lockup shift valve 470. It may be located at the downstream side of the lockup shift valve 470. Such a construction can bring about effects similar thereto.

In the above-described construction, the control pressure that is supplied to the friction engagement elements (the forward clutch 65 and the rearward brake 66) is the pressure itself that is produced by the linear solenoid valve 430. However, the control pressure (the engagement capacity control pressure) that is supplied to the lockup mechanism 50 is the one that is obtained by amplifying the control pressure, which is generated by the linear solenoid valve 430, by the lockup control valve 480. This is because there is a mechanical limit in the characteristic area of linear outputs of the linear solenoid valve 430, and there is a tendency for the output characteristics to be disordered particularly in the low output or high output. However, in the above-described embodiments, sufficiently linear characteristics can be brought about in a wide range of output area, using the lockup control valve 480. On the other hand, since so much highly accurate linear characteristics are not required in the friction engagement elements, except for when starting the vehicle, the above-described embodiments are constructed so that the control pressure, which is generated by the linear solenoid valve 430, is directly supplied. In such a construction, it is possible to effectively control two actuators (friction engagement elements and lockup mechanism 50) by only a single linear solenoid valve 430.

Figure 8:
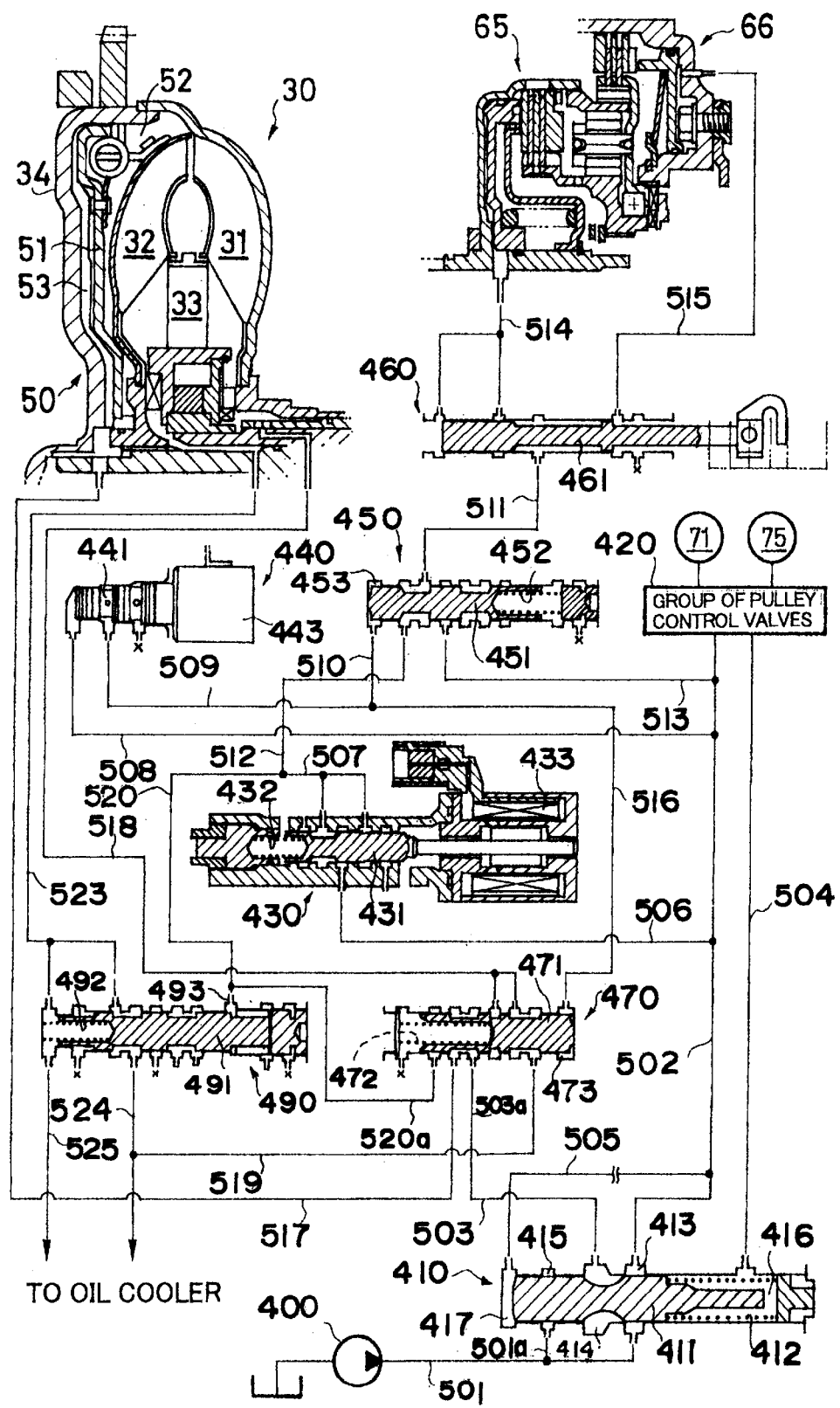
FIG. 8 is a diagram of hydraulic circuits showing a modified example of an apparatus for controlling a power transmission device according to the third aspect of the invention.

FIG. 8 shows a modified version of the controlling apparatus according to the invention, which is a construction not employing the above-described lockup control valve 480. The controlling apparatus according to the above-described modified version differs from the above-described controlling apparatus in that (1) the lockup mechanism control valve 480 is excluded, and a discharge oil pressure controlling valve 490 is provided, (2) the oil lines 521 and 522 are excluded (thereby the oil line 503a is made into an oil line 503), (3) the branched oil line 520a of the oil line 520 is caused to communicate with the lockup shift valve 470 as in the original oil line 522. Herein, the discharge oil pressure controlling valve 490 is composed of a spool 491, which freely moves in the right and left directions in the housing, and a spring 492 that is secured at the leftward side of the spool 491 and normally presses the spool 491 to the rightward side, wherein the spool 491 is driven by a quantity responsive to the control pressure from the linear solenoid valve 430, which is supplied to an oil chamber 493 secured at the rightward side of the spool 491 via the oil line 520, and the discharge oil pressure from the torque converter 30, which is discharged via an oil line 523, is controlled.

The controlling apparatus is constructed so that the linear solenoid valve 430 is connected directly to the lockup shift valve 470 via oil lines 520 and 520a, wherein, when the solenoid valve 440 is turned ON and the lockup shift valve 470 is positioned at the first position, the control pressure that is produced by the linear solenoid valve 430 is supplied to the torque converter 30(lockup mechanism 50) via the oil line 517 as it is. In such a construction, since nothing corresponding to the above-described lockup control valve 480 exists, although the linear control of the lockup mechanism 50 is not necessarily sufficient, effects that are similar to those of the above-described controlling apparatus can be brought about. However, differing from the above-described controlling apparatus, since, in the controlling apparatus, the larger the control pressure from the linear solenoid valve 430 is made, the larger the working oil pressure is supplied into the cover side oil chamber 53, the engagement capacity of the lockup mechanism 50 is made smaller (as already described in relation to the above-described controlling apparatus, the larger the control pressure from the linear solenoid valve 430 becomes, the larger the engagement capacity of the lockup mechanism 50 is made).

Although descriptions were given of the embodiments of the apparatus for controlling a power transmission device according to the invention, the scope of the invention is not limited to the above scope. For example, although, in the above-described embodiments, power of the engine (prime mover) is transmitted via the forward/rearward changer mechanism and belt-type step-free speed changer mechanism, the invention is not limited to such a construction. The invention may be applicable to a power transmission device of other construction if it is provided with a torque converter with a lockup mechanism and friction engagement elements. In addition, in the above-described embodiments, although the power transmission device was applied to a vehicle, the invention is not limited to such a vehicle, but may be applicable to other machinery.

As described above, the apparatus for controlling a power transmission device according to the first aspect of the invention is constructed so that a mode where the lockup mechanism is made into an operating state (a state where the output shaft of a prime mover is coupled with the input shaft of a speed changer), and the pressure (line pressure) of working oil used to operate the speed changer is set to low pressure level, and a mode where the lockup mechanism is made into a non-operating state (a state where the prime mover is disconnected from the speed changer), and the pressure of the working oil is set to a high pressure level are changed over by changing the outputs of two types of signal pressure. Therefore, the latter mode is selected where the load is large and the number of output revolutions (the running speed of a vehicle in which the power transmission device is incorporated) is small, and the former mode is selected where the load is small and the number of output revolutions is large, whereby the fuel consumption can be decreased by lowering the loss of power. In addition, the output of the signal pressure can be changed over by, for example, only an ON-OFF controllable single solenoid valve and control device thereof, and the construction thereof can be simplified.

Also, the apparatus for controlling a power transmission device according to the second aspect of the invention is constructed so that a mode where the lockup mechanism is made into an operating state (a state where the output shaft of a prime mover is connected to the input shaft of a speed changer), and the working oil used to operate the speed changer is supplied at a small capacity from the hydraulic pump, and a mode where the lockup mechanism is made into a non-operating state (a state where the prime mover is disconnected from the speed changer), and the working oil is supplied at a large capacity from the hydraulic pump are changed over by changing the outputs of two types of signal pressures. Therefore, the latter mode is selected where the load is large and the number of output revolutions (the running speed of a vehicle in which the power transmission device is incorporated) is small, and the former mode is selected where the load is small and the number of output revolutions is large, whereby the fuel consumption can be decreased by lowering the loss of power. In addition, the output of the signal pressure can be changed over by, for example, only an ON-OFF controllable single solenoid valve and control device thereof, and the construction thereof can be simplified.

Still further, in the apparatus for controlling a power transmission device according to the third aspect of the invention, it is possible to change an object to be controlled by control pressure produced by the linear solenoid valve to any one of the friction engagement elements and the lockup mechanism, wherein both engagement capacity control of the friction engagement elements and engagement capacity control of the lockup mechanism can be carried out by means of a single linear solenoid valve. Therefore, the apparatus for controlling a power transmission device according to the invention does not require two linear solenoid valves as in the prior arts, wherein the production costs thereof can be remarkably reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Related Applications

This application claims the priority of Japanese Patent Applications No. 2000-058652 filed on Mar. 3, 2000, and No. 2000-066091 filed on Mar. 10, 2000 which are incorporated herein by reference.

What is claimed is:

1. An apparatus for controlling a power transmission device having:
   a speed changer for changing power inputted from a prime mover and outputting the same;
   a torque converter, which is provided between an output shaft of said prime mover and an input shaft of said speed changer, for transmitting power therebetween; and
   a lockup mechanism, which engages the output shaft of said prime mover with the input shaft of said speed changer, for transmitting power therebetween;
   wherein said apparatus comprises a lockup changing means that causes said lockup mechanism to change the position thereof between a first position where the lockup mechanism supplies and discharges a working oil so as to carry out a connection and a second position where the lockup mechanism supplies and discharges said working oil so as to carry out a disconnection;
   a working oil pressure changeover setting means that is capable of changing the pressure setting state thereof to a first state where the pressure of working oil used to operate said speed changer is set to a first pressure and to a second state where the pressure of working oil used to operate said speed changer is set to a second pressure, which is higher than said first pressure; and
   a signal pressure outputting means for selectively outputting any one of a first signal pressure by which said lockup changing means is positioned at said first position and said working oil pressure changing means is made into said first state and a second signal pressure by which said lockup changing means is positioned at said second position and said working oil pressure changing means is made into said second state.

2. The apparatus for controlling a power transmission device as set forth in claim 1, wherein said lockup changing means comprises a lockup shift valve having a shift valve spool that is disposed so as to freely move in the shift valve housing and is caused to move upon selectively receiving said first signal pressure and said second signal pressure;
   said shift valve spool is caused to move to said first position when receiving said first signal pressure, and said lockup mechanism causes the output shaft of said prime mover to be engaged with the input shaft of said speed changer, wherein said shift valve spool supplies and discharges said working oil; and
   said shift valve spool is caused to move to said second position when receiving said second signal pressure, and said lockup mechanism causes the output shaft of said prime mover to be disengaged from the input shaft of said speed changer, wherein said shift valve spool supplies and discharges said working oil.

3. The apparatus for controlling a power transmission device as set forth in claim 2, wherein a shift valve spring, which presses said shift valve spool to said second position, is provided, and said shift valve spool is pressed to said first position by causing a change controlling pressure to operate to said shift valve spool; and
   said first signal pressure consists of said change controlling pressure, which is set to a predetermined oil pressure (>0), and said second signal pressure consists of said change controlling pressure, which is set to zero pressure.

4. The apparatus for controlling a power transmission device as set forth in claim 3, wherein said signal pressure outputting means includes an ON/OFF solenoid valve that causes a change controlling pressure set to said predetermined oil pressure to operate on said shift valve spool and interrupts said operation; and a change controlling pressure of said predetermined oil pressure that becomes said first signal pressure is caused to operate on said shift valve spool by controlling so as to turn ON and OFF said ON/OFF solenoid valve, and said second signal pressure of zero oil pressure is caused to operate on said shift valve spool by interrupting the supply of said predetermined oil pressure to the change controlling pressure.

5. The apparatus for controlling a power transmission device as set forth in claim 1, wherein said working oil change setting means includes a regulator valve, consisting of a regulator valve spool, which is freely movably disposed in a regulator valve housing, and a regulator valve spring that presses said regulator valve spool, which balances and regulates an oil pressure operating on said regulator valve spool with the pressing force of said regulator valve spring;

the oil pressure operating on said regulator valve spool is a working oil pressure used to operate said speed changer, and said first state and second state are changed over by causing a change controlling pressure to operate on said regulator valve spool.

6. The apparatus for controlling a power transmission device as set forth in claim 5, wherein said change controlling pressure is constituted so as to operate in the direction opposite to the pressing direction of said regulator valve spring, and said first signal pressure is a change controlling pressure set to a predetermined oil pressure (>0), and said second signal pressure is said change controlling pressure set to zero oil pressure.

7. The apparatus for controlling a power transmission device as set forth in claim 6, wherein said signal pressure outputting means includes an ON/OFF solenoid valve that causes a change controlling pressure set to said predetermined oil pressure to operate on said regulator valve spool, and interrupts said operation; and a change controlling pressure of said predetermined oil pressure that becomes said first signal pressure is caused to operate on said regulator valve spool by controlling so as to turn ON and OFF said ON/OFF solenoid valve, and said second signal pressure of zero oil pressure is caused to operate on said regulator valve spool by interrupting the supply of said predetermined oil pressure to the change controlling pressure.

\* \* \* \* \*